United States Patent
Ajayan et al.

(10) Patent No.: US 8,906,984 B2
(45) Date of Patent: Dec. 9, 2014

(54) SYNTHESIS OF METAL AND METAL OXIDE NANOPARTICLE-EMBEDDED SILOXANE COMPOSITES

(75) Inventors: Pulickel M. Ajayan, Houston, TX (US); Ashavani Kumar, Houston, TX (US); Anubha Goyal, Houston, TX (US)

(73) Assignee: William Marsh Rice University, Houston, TX (US)

( * ) Notice: Subject to any disclaimer, the term of this patent is extended or adjusted under 35 U.S.C. 154(b) by 192 days.

(21) Appl. No.: 12/537,851

(22) Filed: Aug. 7, 2009

(65) Prior Publication Data

US 2010/0120942 A1 May 13, 2010

Related U.S. Application Data

(60) Provisional application No. 61/086,980, filed on Aug. 7, 2008.

(51) Int. Cl.

| | | |
|---|---|---|
| C08K 7/16 | (2006.01) | |
| C08K 7/18 | (2006.01) | |
| C08K 3/10 | (2006.01) | |
| C08K 3/18 | (2006.01) | |
| C08K 3/22 | (2006.01) | |
| C08J 3/20 | (2006.01) | |

(52) U.S. Cl.
CPC .............. *C08J 3/20* (2013.01); *C08J 2383/04* (2013.01)
USPC ........... 523/223; 524/399; 524/413; 524/431; 524/435

(58) Field of Classification Search
USPC ................... 523/223; 524/399, 413, 431, 435
See application file for complete search history.

(56) References Cited

U.S. PATENT DOCUMENTS

| | | | | |
|---|---|---|---|---|
| 2008/0083299 | A1* | 4/2008 | Simone et al. | .............. 75/345 |
| 2008/0085410 | A1* | 4/2008 | Simone et al. | .......... 428/355 CP |
| 2008/0085962 | A1* | 4/2008 | Simone et al. | ............. 524/403 |
| 2009/0302280 | A1* | 12/2009 | Simone et al. | ............. 252/512 |

OTHER PUBLICATIONS

A. Dane et al., "X-ray Photoelectron Spectorscopic Analysis of Si Nanoclusters in SiO2 Matrix"; Journal of Physical Chemistry B, vol. 110; Dec. 30, 2005; pp. 1137-1140; American Chemical Society; US.
A. Kumar et al.; "Phase transfer of silver nanoparticles from aqueous to organic solutions using fatty amine molecules"; Journal of Colloid and Interface Science 264; no month, 2003; pp. 396-401; Elsevier Science, NL.
A. Kumar et al., "Silver-nanoparticle-embedded antimicrobial paints based on vegetable oil"; Nature Materials; Mar. 2008; pp. 236-241; Nature Publishing Group; Macmillan Publishers Ltd.; US.
B. K. Kuila, et al., "Synthesis, Optical, and Electrical Characterization of Organically Soluble Silver Nanoparticles and Their Poly (3-hexylthiophene) Nanocomposites: Enhanced Luminescence Property in the Nanocomposite Thin Films"; Chemistry of Materials 2007, 19; pp. 5443-5452; American Chemical Society; US.
B. Wang et al.; "Chitosan-Mediated Synthesis of Gold Nanoparticles on Patterned Poly(dimethylsioloxane) Surfaces"; Biomacromolecules 2006, 7; Mar. 24, 3006; pp. 1203-1209; American Chemical Society; US.
D. A. Shirley, "High-Resolution X-Ray Photoemission Spectrum of the Valence Bands of Gold"; Physical Review B vol. 5, No. 12; Jun. 15, 1972; pp. 4709-4714; American Physical Society, US.
D. Ciprari et al., "Characterization of Polymer Nanocomposite Interphase and Its Impact on Mechanical Properties"; Macromolecules 2006, 39; Aug. 18, 2006; pp. 6565-6573; American Chemical Society; US.
E. W. Kreutz et al., "Processing of polymer surfaces by laser radiation"; Nuclear Instruments & Methods in Physics Research Section B-Beam Interactions with Materials and Atoms; no month,1995, pp. 245-249; Elsevier Science, NL.
F. Abbasi et al., "Modification of polysiloxane polymers for biomedical applications: a review"; Polymer International 2001, 50; no month, 2001; pp. 1279-1287; Society of Chemical Industry; UK.
H. Cchen et al., "Direct Laser Writing of Microtunnels and Reservoirs on Nanocomposite Materials"; Advanced Materials 2006, 18; no month, 2006; 2876-2879; Wiley-VCH Verlag GmbH & Co; KGaA, Weinheiml DE.
H. Park et al., "Polymer/Gold Nanoparticle Nanocomposite Light-Emitting Diodes: enhancement of Electroluminescence Stability and Quantum Efficiency of Bluc-Light Emitting Polymers"; Chemistry of Materials 2004, 16; Jan. 21, 2004; pp. 688 692; American Chemical Society; US.
H. R. Gao et at., "Catalytic polymeric hollow-fiber reactors for the selective hydrogenation of conjugated dienes"; Journal of Membrane Science 106; no month, 1995; pp. 213-219; Elsevier Science, NL.
I. Yoshinaga et al., "Effect of Inorganic Components on Thermal Stability of Methylsiloxane-Based Inorganic/Organic Hybrids"; Journal of Sol-Gel Science and Technology 35, no month, 2005; pp. 21-26; Springer Science + Business Media, Inc., NL.

(Continued)

*Primary Examiner* — Kriellion Sanders
(74) *Attorney, Agent, or Firm* — Winstead PC

(57) ABSTRACT

Metal/metal oxide nanoparticle-embedded polymer films were synthesized in situ wherein the polymerizing agent was utilized for both reduction and polymerization (such as curing). This in situ method avoids the use of any external reducing agent/stabilizing agent and leads to a uniform distribution of nanoparticles in the polymer matrix. In some embodiments, additional heating can be utilized to form the nanoparticles embedded in the polymer film.

25 Claims, 16 Drawing Sheets

(56) References Cited

OTHER PUBLICATIONS

J. L. Wilson et al., "Synthesis and magnetic properties of polymer nanocomposites with embedded iron nanoparticles"; Journal of Applied Physics, vol. 95, No. 3; Feb. 1, 2004; pp. 1439-1443; American Institute of Physics, US.

J. N. Lee et al., Solvent Compatibility of Poly(dimethylsiloxane)-Based Microfluidic Devices; Anal. Chem, 2003, 75; Oct. 11, 2003; pp. 6544-6554; American Chemical Society; US.

K. S. Giesfeldt et al., "Studies of the Optical Properties of Metal-Pliable Polymer Composite Materials"; Applied Spectroscopy vol. 57, No. 11,; No Month, 2003; pp. 1346-1352; Society for Applied Spectroscopy; US.

L. Ci et al., "Continuous Carbon Nanotube Reinforced Composites"; Nano Letters 208, vol. 8, No. 9; Aug. 5, 2008; pp. 2762-2766; American Chemical Society; US.

M. T. Sulak, et al. "Amperometric glucose biosensor based on gold-deposited polyvinylferrocene film on Pt electrode"; Biosensors & Bioelectronics 21, No month, 2006; pp. 1719-1726; Elsevier Science, NL.

N. Siafie et al., "Effect of PDMS cross-linking degree on the permeation performance of PAN/PDMS composite nanofiltration membranes"; Separation and Purification Technology 45, No month, 2005; pp. 220-231; Elsevier Science, NL.

O. Choi et at., "The inhibitory effects of silver nanoparticles, silver ions, and silver chloride colloids on microbial growth"; Water Research 42; no month, 2008; pp. 3066-3074; Elsevier Science, NL.

Q. Zhang et al., "In-situ synthesis of poly(dimethylsiloxane)-gold nanoparticles composite films and its application in micrufluidic systems", Lab on a Chip; Nov. 14, 2007; pp. 352-357; The Royal Society of Chemistry 2008, UK.

R. H. Gee et al., "Molecular dynamics studies on the effects of water speciation on interfacial structure and dynamics in silica-filled PDMS composites"; Polymer 45, no month, 2004; pp. 3885-3891; Elsevier Science, NL.

R. M. Slowson et al., "Germanium and Silver Resistance, Accumulation, and Toxicity in Microorganisms"; Plasmid 27, no month, 1992; pp. 72-79; Academic Press, Inc.; Elsevier Science, NL.

S. Dire et al., "Sol-Gel Synthesis of Siloxane-Oxide Hybrid Coatings [Si(CH3)2O-MOx: M=Si, Ti, Zr, Al] with Luminescent Properties"; Journal of Materials Chemistry 2, Jan. 1, 1992; 239-244; Royal Society of Chemistry; UK.

S. K. Gogoi et at., "Green Fluorescent Protein-Expressing *Escherichia coli* as a Model System for Investigating the Antimicrobial Activities of Silver Nanoparticles"; Langmuir, 22, Oct. 3, 2006; pp. 9322-9328; American Chemical Society; US.

S. Mahendra et al., "Quantum Dot Weathering Results in Microbial Toxicity"; Environmental Science and Technology 2008, 42; Nov. 14, 2008; pp. 9424-9430; American Chemical Society; US.

T. Kaully et al., "Mechanical Behavior of Highly Filled Natural CaCO3 Composites: Effect of Particle Size Distribution and Interface Interactions"; Polymer Composites 2008, 29; no month, 2008; pp. 396-408; John Wiley & Sons, Inc.; US.

T. Yamaguchi et al., "Olefin separation using silver impregnated ion-exchange membranes and silver salt/polymer blend membranes"; Journal of Membrane Science 117; no month 1996; pp. 151-161; Elsevier Science, NL.

W. F. Maddams, "A review of Fourier-transform Raman spectorscopic studies on polymers"; Spectrochimica. Acta vol. 50A; No. 11; no month, 1994; Elsevier Science, NL.

\* cited by examiner

SYNTHESIS OF METAL AND METAL OXIDE NANOPARTICLE-EMBEDDED SILOXANE COMPOSITES

CROSS-REFERENCE TO RELATED PATENT APPLICATIONS

This application claims priority to: provisional U.S. Patent Application Ser. No. 61/086,980, filed on Aug. 7, 2008, entitled "Synthesis Of Metal And Metal Alloy Nanoparticle-Embedded Siloxane Composites," which provisional patent application is commonly assigned to the assignee of the present invention and is hereby incorporated herein by reference in its entirety for all purposes.

This application discloses subject matter related to the subject matter of U.S. patent application Ser. No. 12/538,010, filed concurrent herewith, in the name of P. M. Ajayan et al., entitled "Metal And Metal Oxide Nanoparticle-Embedded Composites," which application is commonly assigned to the assignee of the present invention and hereby incorporated herein by reference in its entirety.

GOVERNMENT INTEREST

The present invention was made with United States Government support under Grant No. CMS-0609077 awarded by the National Science Foundation (which funding of this support was received through the University of Dayton Research Grant No. RSC08007). The United States Government has certain rights in the invention.

BACKGROUND

1. Field of the Invention

This invention relates generally to a method for synthesizing metal and metal oxide nanoparticle-embedded composites and compositions of same.

2. Background of the Invention

Nanocomposites of inorganic materials in polymer matrices have attracted a great deal of attention because of their wide applications as biosensors, optical devices, micromechanical devices and advanced catalytic membranes. [M. T. Sulak, et al. *Biosensors & Bioelectronics* 2006, 21, 1719; S. Dire et al., *Journal of Materials Chemistry* 1992, 2, 239; H. Chen et al., *Advanced Materials* 2006, 18, 2876; H. Chen et al., *Advanced Materials* 2006, 18, 2876]. For the synthesis of nanocomposites, different approaches have been developed, such as the incorporation of pre-made nanoparticles into a polymer matrix with the use of a common blending solvent or by reduction of metal salt dispersed in polymeric matrix using an external reducing agent. [J. H. Park et al., *Chemistry of Materials* 2004, 16, 688]. Nanoparticles can also be embedded in polymers using physical and chemical vapor deposition, ion-implantation and sol-gel synthesis routes. [K. S. Giesfeldt et al., *Applied Spectroscopy* 2003, 57, 1346; E. W. Kreutz et al., *Nuclear Instruments & Methods in Physics Research Section B-Beam Interactions with Materials and Atoms* 1995, 105, 245; I. Yoshinaga et al., *Journal of Sol-Gel Science and Technology* 2005, 35, 21]. Using these approaches, various metal nanoparticle-polymer composites have been synthesized including gold-poly(9,9-dioctylfluorene) for light emitting diodes and iron-poly(methylmethacrylate) for electromagnetic applications. [J. L. Wilson et al., *J. Appl. Phys.* 2004, 95, 1439]. Gao et al. have used palladium-containing hollow polymeric fibers of cellulose acetate, polysulfone, and polyacrylonitrile as catalytic membrane reactors for selective hydrogenation of conjugated dienes. [H. R. Gao et al., *J. Membr. Sci.* 1995, 106, 213].

Polydimethylsiloxane (PDMS) elastomer is one such polymer that has been utilized when synthesizing nanocomposites. PDMS has many useful properties, such as high flexibility, ease of molding, low cost, non-toxic nature and chemical inertness. [J. N. Lee et al., *Anal. Chem.* 2003, 75, 6544 ("Lee et al.")]. PDMS has been used extensively in applications that include microfluidic channels, lubricants, defoaming agents, gas separation membranes and catheters. [F. Abbasi et al., *Polymer International* 2001, 50, 1279]. In spite of its wide use, it has some inherent drawbacks, such as mechanical weakness and intolerance to organic solvents. [Lee et al.]. Metal nanoparticle containing film can show enhanced mechanical properties as well as imparts multifunctionality like catalysis and gas separation capability. Therefore, attempts have been made to synthesize metal nanoparticles embedded PDMS films. Gao and co-workers have reported chitosan assisted gold nanoparticle deposition on PDMS surfaces. [B. Wang et al., *Biomacromolecules* 2006, 7, 1203]. Chen and co-workers synthesized gold nanoparticle-PDMS composite films by immersing cured PDMS films in gold chloride solution. These films were used for enzyme immobilization and as a chemical reactor. However, their synthesis method involves multiple steps and the nanoparticle concentration is localized to the surface only. [Q. Zhang et al., *Lab on a Chip* 2008, 8, 352 ("Zhang")].

Consequently, there is a need for an improved process for synthesizing metal and metal oxide nanoparticle-embedded composites. The term "metal" refers collectively to a pure metal (i.e., one type of metal, such as silver, gold, etc.) and a metal alloy (i.e., mixtures of two or more metals, such as PdFe, PdNi, etc., or mixtures of one or more metals with certain nonmetallic elements, such as carbon steel). Coordinately, the term "metal oxide" refers collectively to an oxide of a pure metal (i.e., an oxide of one type of metal, such as iron oxide) and an oxide of an alloy of metals (i.e., an oxide of two or more metals, such as iron-copper oxide).

SUMMARY OF THE INVENTION

This invention relates to methods for synthesizing metal and metal oxide nanoparticle-embedded composites and compositions regarding same.

In general, in one aspect, the invention features a method of synthesizing a nanoparticle-embedded polymer composite. The method includes combining a polymerizable material, a polymerizing agent, and a metal salt to form a mixture. The method further includes forming the nanoparticle-embedded polymer composite by polymerizing the polymerizable material to form a polymer, and by reducing the metal salt to form nanoparticles embedded within the polymer.

Implementations of the invention can include one or more of the following features:

The polymerizing agent can polymerize the polymerizable material to form the polymer and reduces the metal salt to form the nanoparticles.

The method can further include agitating the mixture such that there is a bulk dispersion of nanoparticles in the nanoparticle-embedded polymer composite. This agitation can be utilized to uniformly distribute the polymerizable material, the polymerizing agent, and the metal salt in the mixture.

The polymerizable material can include polydimethylsiloxane, polystyrene, poly(methyl methacrylate), polyvinyl acetate, or polyethylene, or can include a monomer or an oligomer that polymerizes to form one of these specified polymers.

The polymerizable material can include a polymer that exhibits high-temperature stability that is capable of being cured by a free radical mechanism, or can include a monomer and an oligomer that are capable of being polymerized by a free radical mechanism to form polymers exhibiting high temperature stability.

The polymerizable material can include a siloxane. The siloxane can be polydimethyl siloxane.

The polymerizing of the polymerizable material to form a polymer can include a peroxide-initiated polymerization, a platinum-catalyzed addition polymerization, or a tin-catalyzed condensation polymerization.

The polymerizing agent can include being capable of initiating a peroxide-initiated polymerization, a platinum-catalyzed addition polymerization, or a tin-catalyzed condensation polymerization.

The metal salt can include silver, gold, palladium, platinum, copper, cobalt, nickel, or iron.

The metal salt can include silver.

The metal salt can include being prepared by mixing a metal precursor and a solvent. The metal precursor can be silver benzoate, chloroauric acid, chloroplatinic acid, palladium acetylacetonate, cobalt acetylacetonate, nickel acetylacetonate, iron carbonyl, nickel carbonyl, or cobalt carbonyl. The metal precursor can include silver benzoate. The metal precursor can include a transition metal. The metal precursor can include at least two transition metals. The metal salt can further include being prepared by mixing a second metal precursor with the metal precursor and the solvent. The solvent can include a non-polar solvent. The molar concentration of the metal precursor in the solvent can be in the range between about $1 \times 10^{-5}$ and about $5 \times 10^{-2}$.

The polymerizable material and the polymerizing agent can be combined in a weight ratio at most about 10:1. The polymerizable material and the polymerizing agent can be combined in a weight ratio in the range between about 2:1 and about 10:1. The molar concentration of the metal precursor in the solvent can be in the range between about $1 \times 10^{-5}$ and about $5 \times 10^{-2}$, and the ratio of (A) the polymerizable material and the polymerizing agent and (B) the metal precursor and solvent can be in the range between about 2 grams/ml and about 4 grams/ml.

The weight ratio of the polymerizable material and the polymerizing agent can be about 10:1.

The method can further include degassing the mixture.

The polymerization can be performed at a temperature in the range between about room temperature and about 100° C.

The polymerization can be performed at about room temperature.

The polymer can be heated after the polymerization step. This heating can decompose the metal salt to form metal nanoparticles. This heating can be performed at a temperature in the range between about 150° C. and about 300° C.

This heating can be performed at a temperature in the range between about 200° C. and about 250° C.

The nanoparticles formed by the method can include pure metal nanoparticles.

The nanoparticles formed by the method can include metal alloy nanoparticles.

The nanoparticles formed by the method can include pure metal oxide nanoparticles.

The nanoparticles formed by the method can include metal oxide alloy nanoparticles.

The polymerizable material can include polydimethylsiloxane, the metal salt can include silver, gold, or palladium, the polymerizing agent can polymerize the polymerizable material to form the polymer at about room temperature, and the polymerizable agent can reduce the metal to form bare, noble metal nanoparticles embedded within the polymer.

The metal salt includes silver.

The majority of the nanoparticles formed can range in size between about 5 nm and about 20 nm.

In general, in another aspect, the invention features a nanoparticle-embedded polymer composite. The nanoparticle-embedded polymer composite is synthesized by a method that includes combining a polymerizable material, a polymerizing agent, and a metal salt to form a mixture. The method further includes forming the nanoparticle-embedded polymer composite by polymerizing the polymerizable material to form a polymer, and by reducing the metal salt to form nanoparticles embedded within the polymer.

Implementations of the invention can include one or more of the features listed above.

In general, in another aspect, the invention features a nanoparticle-embedded polymer composite that includes a polymer and nanoparticles. The nanoparticles are uncapped, are metal nanoparticles or metal oxide nanoparticles, and are bulk distributed within the polymer.

Implementations of the invention can include one or more of the features listed above, as well as the following features:

The polymer can include polydimethylsiloxane, polystyrene, poly(methyl methacrylate), polyvinyl acetate, polyethylene and crosslinked polymers of these polymers.

The polymer can be cured polydimethylsiloxane.

The nanoparticles can include silver nanoparticles, gold nanoparticles, palladium nanoparticles, platinum nanoparticles, copper nanoparticles, cobalt nanoparticles, nickel nanoparticles, or iron nanoparticles.

The nanoparticles can include silver nanoparticles.

The nanoparticles can include PdFe nanoparticles, PdNi nanoparticles, PdCo nanoparticles, PtFe nanoparticles, PtNi nanoparticles, PtCo nanoparticles, NiCo nanoparticles, CuNi nanoparticles, CuNi nanoparticles, CuPd nanoparticles, CuPt nanoparticles, NiFe nanoparticles, or FeCo nanoparticles.

The nanoparticles can include silver oxide nanoparticles, palladium oxide nanoparticles, platinum oxide nanoparticles, copper oxide nanoparticles, cobalt oxide nanoparticles, nickel oxide nanoparticles, or iron oxide nanoparticles.

The nanoparticles can include PdFe oxide nanoparticles, PdNi oxide nanoparticles, PdCo oxide nanoparticles, PtFe oxide nanoparticles, PtNi oxide nanoparticles, PtCo oxide nanoparticles, NiCo oxide nanoparticles, CuNi oxide nanoparticles, CuNi oxide nanoparticles, CuPd oxide nanoparticles, CuPt oxide nanoparticles, NiFe oxide nanoparticles, or FeCo oxide nanoparticles.

The polymer can include siloxane, and the nanoparticles can include silver nanoparticles, gold nanoparticles, or palladium nanoparticles. The siloxane can be cured polydimethylsiloxane The nanoparticles can be uniformly distributed within the nanoparticle-embedded polymer composite.

The nanoparticle-embedded polymer composite can exhibit antibacterial properties.

A majority of the nanoparticles in the nanoparticle-embedded polymer can be in the size between about 5 nm and about 20 nm.

The Young's modulus for the nanoparticle-embedded composite can be at least about three times higher than the polymer without the nanoparticles embedded therein.

In general, in another aspect, the invention features a method that includes selecting a nanoparticle-embedded polymer composite synthesized by a process that includes combining a polymerizable material, a polymerizing agent, and a metal salt to form a mixture. The synthesizing process further includes forming the nanoparticle-embedded polymer composite by polymerizing the polymerizable material to form a polymer, and by reducing the metal salt to form nanoparticles embedded within the polymer. The method further includes utilizing the nanoparticle-embedded polymer composite in one of the following applications and/or uses: pneumatic actuators, microfluidic channels, biomedical devices and applications, gas and vapor phase separators, catalysts, separators of organics from water, micro-fluidic based reactors, damping materials, antibacterial glue and lubricants, antibacterial coating agents, hydrogen storage materials, other lubricants, conditioners, gloss enhancers, sealing agents, and antifoaming agents.

Implementations of the invention can include one or more of the features listed above, as well as the following features:

The nanoparticles include silver nanoparticles, the nanoparticle-embedded polymer composite can exhibit an antibacterial property, and the application/use utilizes this antibacterial property.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
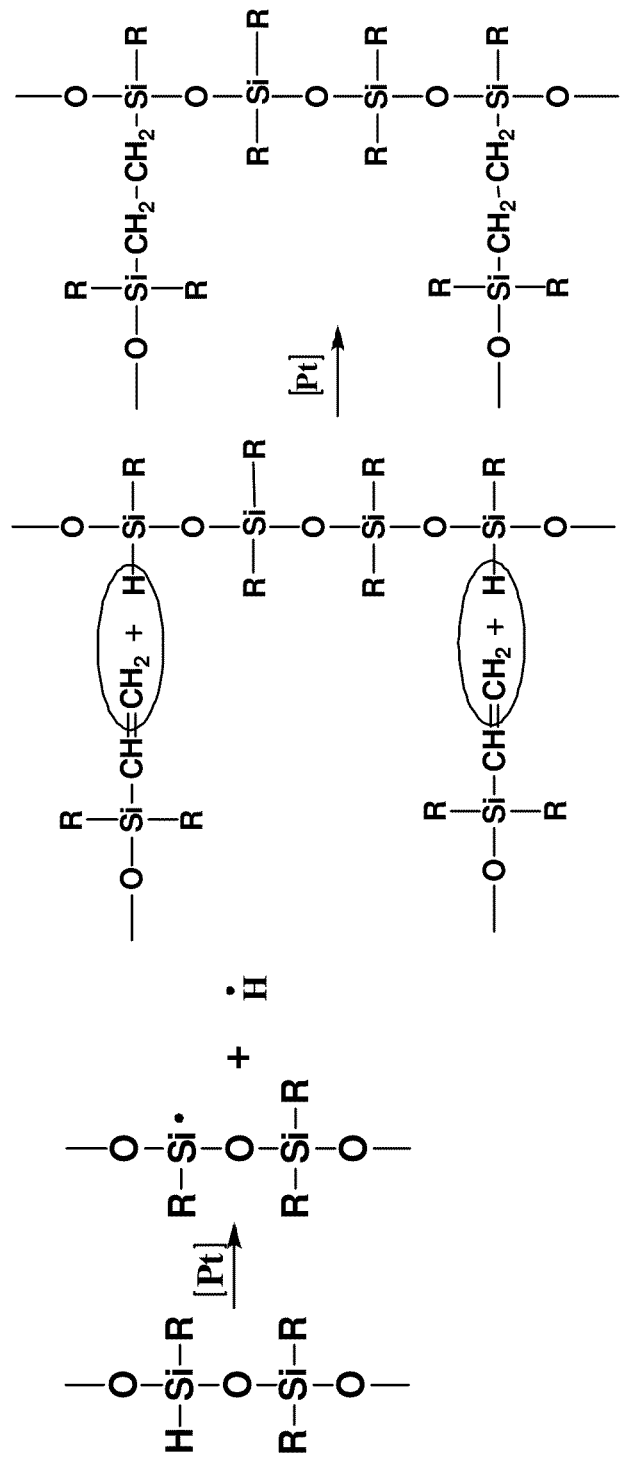
FIG. 1 illustrates a free radical platinum-catalyzed polymerization process utilized in an embodiment of the present invention.

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The present invention is a method and apparatus that synthesizes metal/metal oxide nanoparticle-embedded in composites, such as PDMS composites.

While the making and/or using of various embodiments of the present invention are discussed below, it should be appreciated that the present invention provides many applicable inventive concepts that may be embodied in a variety of specific contexts. The specific embodiments discussed herein are merely illustrative of specific ways to make and/or use the invention and are not intended to delimit the scope of the invention.

The present invention circumvents the need of using preformed nanoparticles and gives a bulk dispersion of nanoparticles without requiring any external reducing or stabilizing agent. The process involves adding a metal salt to a mixture of (a) a polymerizable material (i.e., a monomer, a oligomer, and/or a polymer, such as a siloxane elastomer) and (b) a polymerizing agent (such as curing agent/hardener). The polymerizing agent is operable to perform a dual role of reducing the metal salt to form noble metal/metal oxide nanoparticles and to polymerize the polymerizable material (the monomer, oligomer, and/or polymer) to form the polymer matrix (including curing the elastomer). The term "polymerizing" includes curing/hardening of the polymerizable material, such as due to cross-linking This synthesis method leads to a good dispersion of nanoparticles in the polymer matrix. Nanoparticles act as filler and enhance the mechanical properties of the polymer matrix. In some embodiments, it has been found that the Young's modulus of the nanoparticle containing film is three times higher than that of the pure polymer film. Silver containing films show antimicrobial activity making it an ideal candidate for biomedical applications that include implants and urethral catheters. The platinum and gold nanoparticles embedded films can be used for optical and catalytic applications.

With respect to the polymerizable material (monomer, oligomer, and/or polymer), these are polymerized/cured using a free radical mechanism. The polymerizing agent is operable for such free radical mechanism to occur so that the polymerizable material is polymerized. In one embodiment, the polymerizable material utilized is PDMS. Other polymerizable materials include, but are not limited to, polystyrene, poly (methyl methacrylate) (PMMA), polyvinyl acetate (PVA), polyethylene, and other polymers that exhibit high-temperature stability (e.g., stability 250° C. or higher), that are capable of being polymerized (including cured and/or hardened) by a free radical mechanism. Other polymerizable materials include monomers and oligomers that polymerize to form the polymers identified above.

As for the polymerization process, a variety of such processes can be used, including peroxide-initiated polymerization (e.g., for polymers with vinyl groups), platinum-catalyzed addition polymerization (e.g., for polymers with vinyl groups and crosslinking agents with Si—H groups), and tin-catalyzed condensation polymerization (for compositions including dihydroxypolydimethylsiloxanes and silicic acid esters).

PDMS is an advantageous material to use due to its ease of fabrication, optical transparency, thermal stability, chemical inertness, non-toxicity, and its relatively low cost. The disadvantages of using PDMS, including that it is mechanically weak, highly hydrophobic, and swells in organic medium, are significantly tempered by the inclusion of the metal/metal oxide nanoparticles formed in situ in the material during the present invention.

With respect to the metal salt, this can be formed by introducing a metal precursor in a solvent. The metal in the metal precursor can be, for example, silver, gold, palladium, platinum, copper, cobalt, nickel, iron, etc. For instance, a metal precursor (e.g., silver benzoate, chloro auric acid, chloroplatinic acid, palladium acetylacetonate, cobalt acetylacetonate, nickel acetylacetonate, iron carbonyl, nickel carbonyl, cobalt carbonyl, and other metal benzoates, acetylacetonates, and carbonyls, etc.) can be solublized in a nonpolar solvent to form the metal salt. One or more metal precursors can be used to form the metal salt. Thus, the metal salt may contain one or more metals. When more than one metal is utilized (i.e., a combination of two or more of silver, gold, palladium, platinum, copper, cobalt, nickel, iron, etc.), the resulting nanoparticles formed generally will be an alloy of such metals. For instance, the nanoparticles of PdFe, PdNi, PdCo, PtFe, PtNi, PtCo, NiCo, CuNi, CuNi, CuPd, CuPt, NiFe, and FeCo can be formed using the present invention. In some instances, the metal is oxidized; for instance, nanoparticles of iron oxide can be formed using the present invention.

The polymerizing agent is selected such that it is operable to perform the dual role of reducing the metal salt to form the noble metal/metal oxide nanoparticles and to polymerize the polymerizable material. The advantages of this is that it avoids the use of external reducing or stabilizing agents. Moreover, because this allows in-situ formation of the nanoparticles, there is no need to coat the nanoparticles to prevent particle agglomeration. Rather than having to provide such a coating (such as by using a stabilizer), the nanoparticles are "bare" or "uncapped" within the composite. Also, this process allows the nanoparticles to be uniformly distributed throughout the composite, which is difficult to do with preformed nanoparticles.

Referring to the figures, FIG. 1 illustrates the free radical platinum-catalyzed addition curing process utilized in a PDMS elastomer kit (Sylgard 184 DOW Corning). PDMS is cured by an organometallic free radical based crosslinking reaction. It is commercially available as a two-part system consisting of the monomer and a curing agent. The two components are mixed together in the recommended proportions.

PDMS monomer is vinyl terminated and contains —O—Si$(CH_3)_2$— as the repeating unit while the curing agent is a methyl terminated monomer containing —O—SiH($CH_3$)— repeating units. On mixing the two, free radicals are formed in the curing agent and crosslinking takes place via the reaction between the monomer's vinyl groups and the free radicals generated at the crosslinker's silicon hydride groups to form Si—CH.

Figure 2:
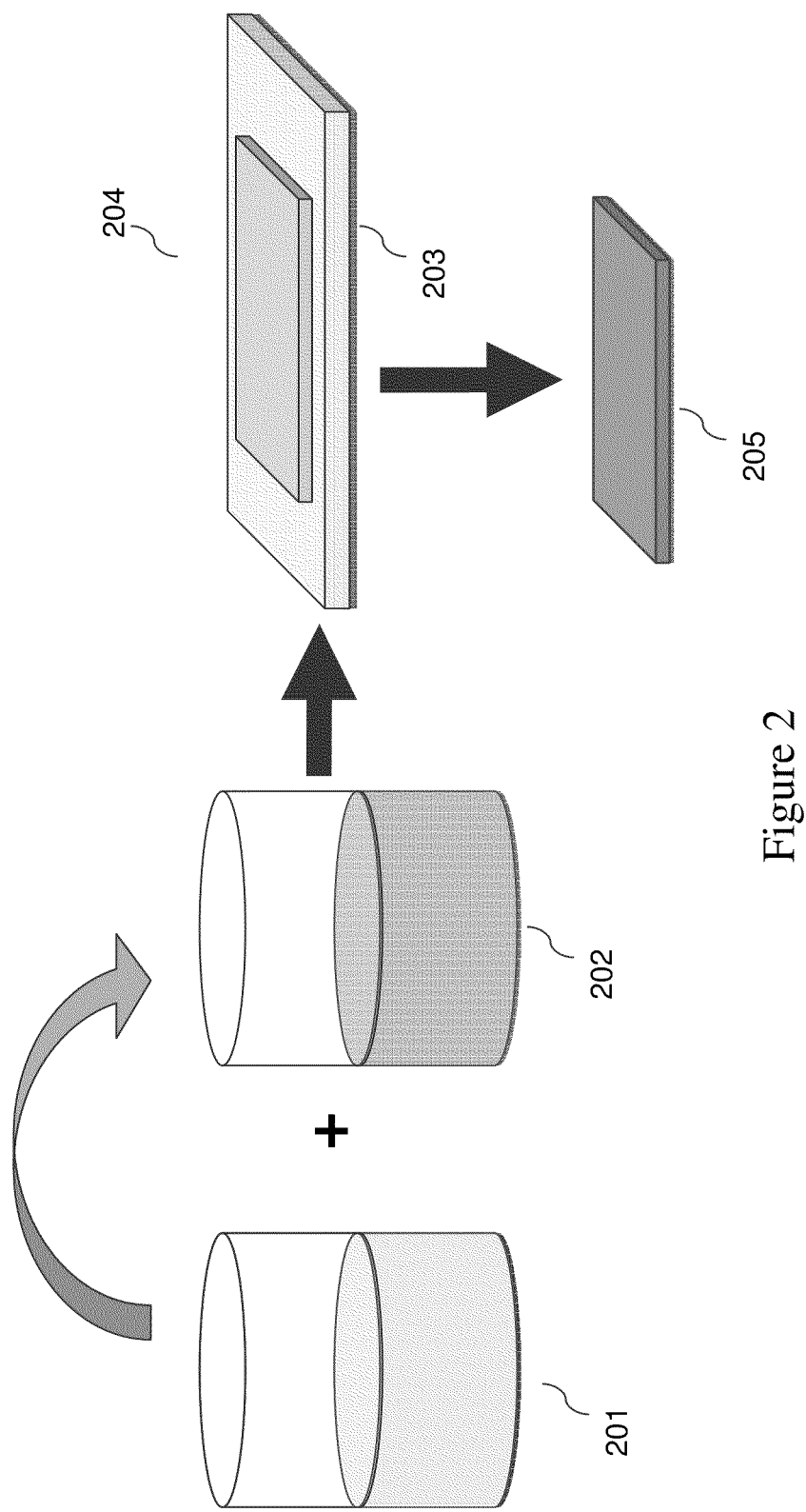
FIG. 2 illustrates the general process steps that can be utilized in an embodiment of the present invention.

FIG. 2 illustrates the general process steps that can be utilized in the present invention. As shown in FIG. 2, a first solution 201 is formed that includes the metal salt.

For instance, the first solution 201 can be a solution of metal precursor (such as silver benzoate) in a solvent (such as hexane). The molar concentration of the metal precursor in the solvent can be in the range between about $1 \times 10^{-5}$ and about $5 \times 10^{-2}$. A second solution 202 is also formed that includes the (a) polymerizable material and (b) a polymerizing agent. For instance, the second solution 202 can include PDMS mixed thoroughly with the appropriate amount of polymerizing agent (at a polymerizable material to polymerizing agent weight ratio of about 10:1 or less, more optionally in the range of about 2:1 and about 10:1). First solution 201 is then mixed thoroughly with second solution 202 to form the mixture of the (a) the polymerizable material, (b) the polymerizing agent, and (c) the metal salt. In embodiments, the mixture is thoroughly mixed such that the metal salt of the first solution 201 is uniformly distributed throughout the second solution 202. (The term "uniformly distributed" means that the concentration is generally the same throughout.) In alternative embodiments, the components of this mixture can be mixed in a different order.

The resulting mixture of solutions 201 and 202 can then be cast, such as cast mixture 203 on glass slide 204, as illustrated in FIG. 2. The cast mixture 203 then polymerizes to form the polymer material 205 having the formed metal/metal oxide nanoparticles within the polymer matrix of the polymer material 205. In some embodiments, the polymerization of the polymerizable material and the formation of the nanoparticles from the metal salt occurs simultaneously. In other embodiments, the polymerization occurs completely or substantially, and, thereafter, the nanoparticles are substantially formed.

The amount of polymerizing agent controls the chemical kinetics as to how fast (or slow) the polymerizable material polymerizes and the nanoparticles form. The rates for these two reactions can be changed, for example, by increasing/decreasing the concentration of the polymerizing agent in the mixture. These rates can also be changed by increasing or decreasing the temperature underwhich these reactions are taking place.

In some embodiments, the polymerization and the formation of nanoparticles occurs at temperatures in the range of about room temperature and about 100° C., such as about room temperature or about 80° C. In some embodiments, the polymerization takes place within such a temperature range, and then, after such polymerization is complete or substantially complete, the temperature is raised to a range of about 150° C. and about 300° C. (more optionally in a range of about 200° C. and about 250° C.) to form the metal nanoparticles.

Synthesis of Silver Nanoparticle-Embedded Polymer Composites

In one embodiment of the present invention, silver nanoparticle-embedded polymer composites are synthesized. PDMS elastomer kits (Sylgard 184, DOW Corning) and silver benzoate (Sigma Aldrich) were utilized. The kit contained the elastomer (PDMS) and the polymerization (curing) agent, which is composed of dimethyl, methylhydrogen siloxane, dimethyl siloxane, dimethylvinylated and trimethylated silica, tetramethyl-tetravinyl cyclotetrasiloxane, and ethyl benzene. 8 grams of PDMS were mixed thoroughly with the curing agent in a weight ratio of 10:1 and then degassed under vacuum to remove the entrapped air bubbles. 3 ml of $2\times10^{-2}$ M solution of silver benzoate in hexane was added to the siloxane elastomer and curing agent mixture. This resultant mixture was sonicated for 15 minutes to obtain a homogeneous mixture. The color changed from transparent to brown due to formation of nanoparticles in the mixture. This polymer mixture was then casted on glass slides and cured under vacuum at room temperature. In an alternative embodiment, the mixture was casted on glass slides and cured at 80° C. in air.

The silver nanoparticle-embedded PDMS can be used to take advantage of known properties of silver (such as for its antimicrobial activity and in polymers for olefin gas separation). [T. Yamaguchi et al., *J. Membr. Sci.* 1996, 117, 151].

Figure 3:
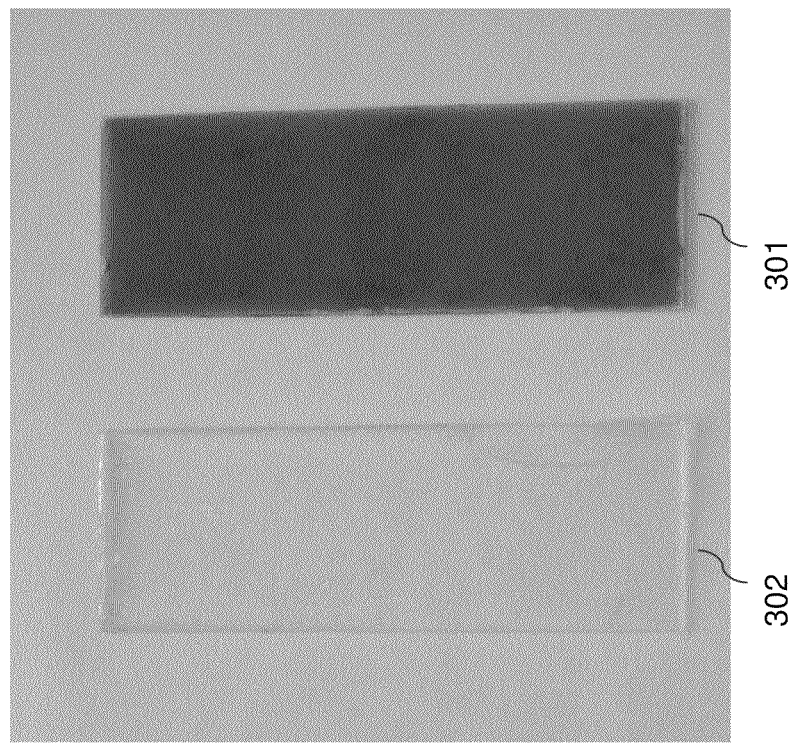
FIG. 3 shows a silver nanoparticle-embedded PDMS film synthesized utilizing an embodiment of the present invention and a pure PDMS film.

FIG. 3 shows the silver nanoparticle-embedded PDMS (Ag-PDMS) film 301 formed by this process. FIG. 3 further shows a pure PDMS film 302 formed by this process in the absence of utilizing silver benzoate (i.e., a PDMS film without any embedded nanoparticles).

Figure 4:
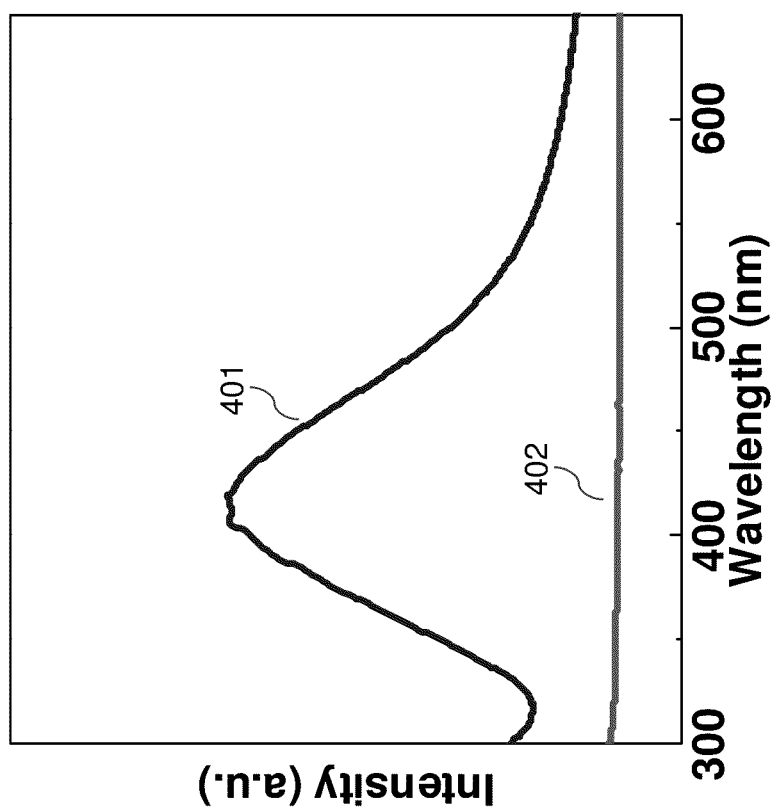
FIG. 4 is a UV-Visible spectrum of the silver nanoparticle-embedded PDMS film shown in FIG. 3.

The brown characteristic color of the Ag-PDMS film 301 indicated the formation of silver nanoparticles. The existence of the silver nanoparticles in the Ag-PDMS film 301 was confirmed by UV-Vis spectroscopy. FIG. 4 is the UV-Visible spectrum of silver nanoparticle-embedded PDMS (Ag-PDMS) film 301 (Ag-PDMS), including a comparison with pure PDMS film 302. UV-Vis spectroscopy measurements of the films were performed on a spectrophotometer (Shimadzu UV-3600) operated at a resolution of 1 nm. Curve 401 reflects the UV-Vis spectra of Ag-PDMS film 301, and curve 402 reflects the UV-Vis spectra of pure PDMS film 302. Ag-PDMS film 301 showed a broad absorbance centered at approximately 415 nm. The surface plasmon band is broader and shifted to a higher wavelength compared to silver nanoparticles dispersed in a solvent. This is consistent with past reports. [See, e.g., B. K. Kuila, et al., *Chemistry of Materials* 2007, 19, 5443].

Figure 5B:
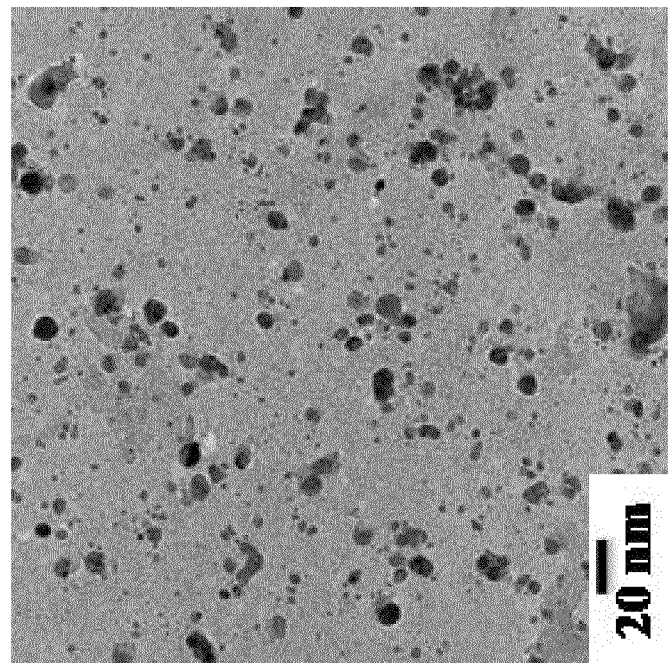
FIGS. 5A-5B are low and high magnification TEM images of silver nanoparticles extracted from the silver nanoparticle-embedded PDMS film shown in FIG. 3.
Figure 5A:
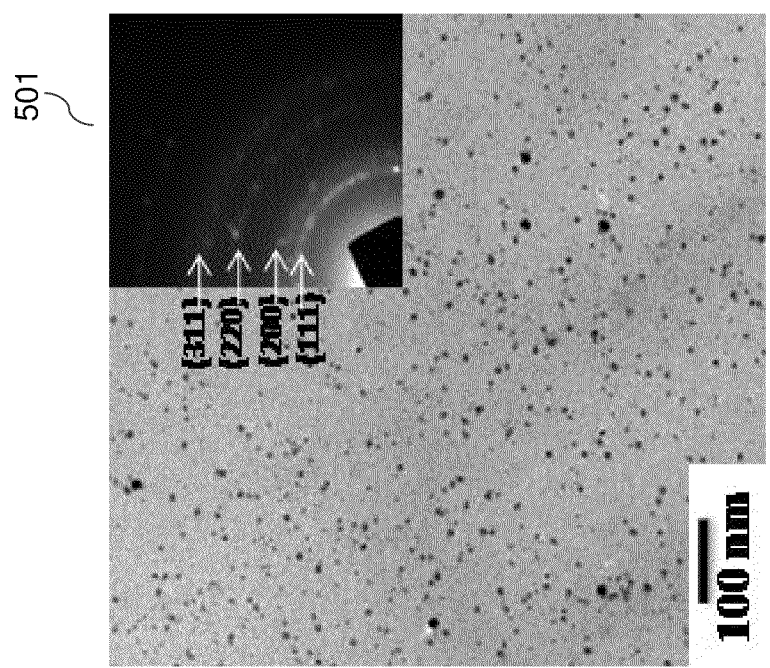

FIGS. 5A-5B are low and high magnification TEM (transmission electron microscopy) images of a drop casted film of nanoparticles extracted from the Ag-PDMS film 301 (i.e., these are TEM images of silver nanoparticles extracted from Ag-PDMS film 301). These TEM images are not a thin section TEM images of the Ag-PDMS film. (Similarly, the other TEM images in the figures are not thin section TEM images of the relevant polymer film).

These TEM images indicate that the silver nano-particles are well defined, discrete, and polydispersed. The inset 501 of FIG. 5A shows the electron diffraction pattern obtained from the nanoparticles. As revealed by this electron diffraction pattern, the silver nanoparticles are crystalline and have a fcc structure.

Figure 6:
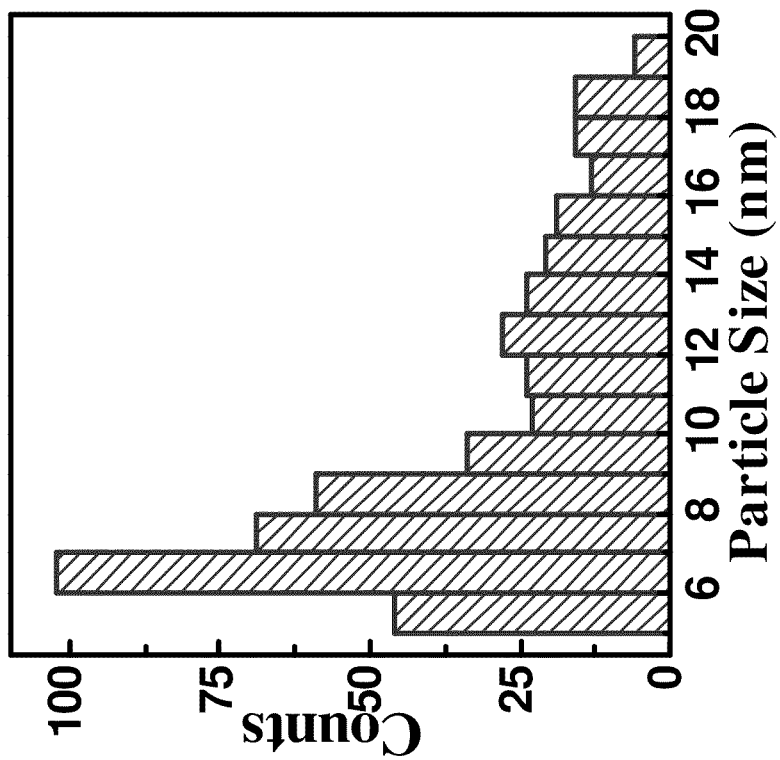
FIG. 6 illustrates the particle size distribution measurements of the silver nanoparticle-embedded PDMS film shown in FIG. 3.

The size of nanoparticles was determined using the transmission electron microscope (JEOL 1230) operated at 120 KV. Particle size distribution measurement (as shown in FIG. 6) revealed that the size of the particles were in the range of about 5 and about 20 nm. Optical imaging (CytoViva) was done to determine the particle distribution of the nanoparticles in the matrix.

X-ray photoelectron spectroscopy (XPS) was performed on a fractured surface of Ag-PDMS film 301 to investigate the chemical interactions of the nanoparticles within the PDMS matrix (which confirmed the reduction of the metal in the process). The general scan spectra of the Ag-PDMS film 301 at room temperature showed the presence of C1s, Si2p, O1s and Ag3d core levels with no evidence of impurities. The spectra were background corrected using the Shirley algorithm [D. A. Shirley, *Physical Review B* 1972, 5, 4709] prior to curve deconvulation. The binding energy of 284.5 eV for adventitious carbon (C1s) was used as the internal standard.

Figures 7A, 7B:
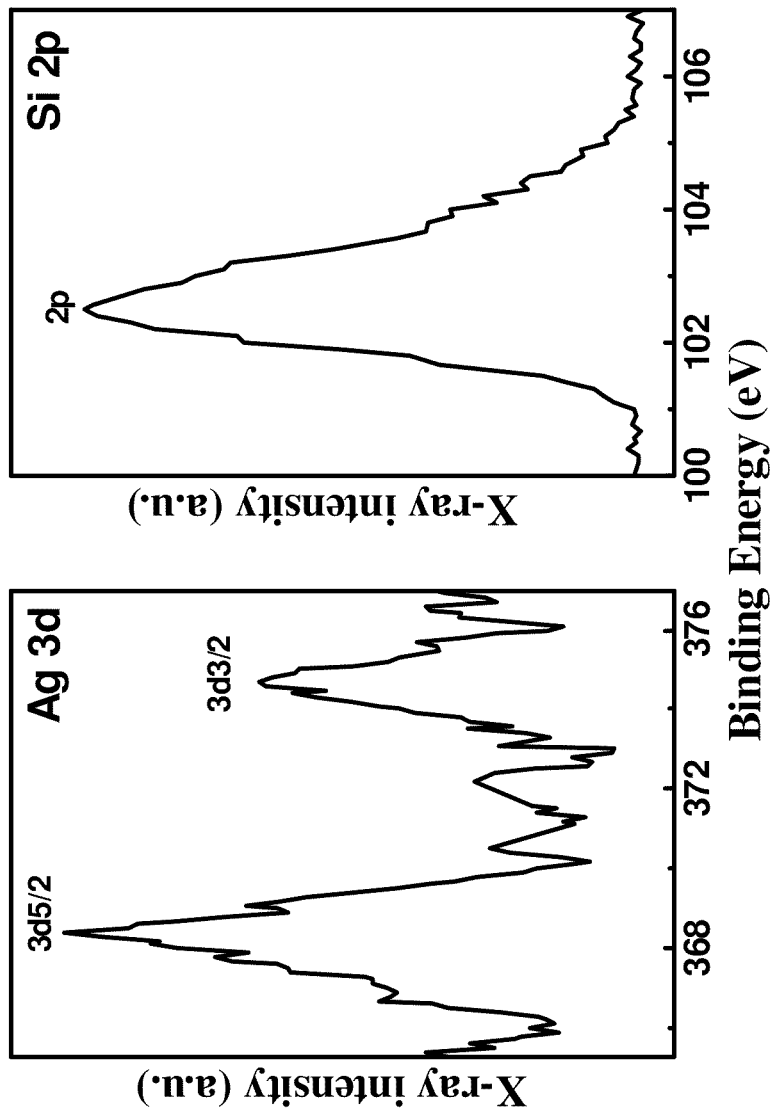
FIGS. 7A-7B show the Ag3d and Si2p core level spectrum, respectively, recorded of the silver nanoparticle-embedded PDMS film shown in FIG. 3.

FIG. 7A shows the Ag3d core level spectrum recorded from the Ag-PDMS film. The spectrum could be resolved into one spin-orbit pairs with the two chemically shifted components, 3d5/2 and 3d3/2 binding energies (BEs) centered at 368.24 eV and 374.25 eV, respectively, that correspond to the electron emission from Ag(0) state. [A. Kumar et al., *Journal of Colloid and Interface Science* 2003, 264, 396]. The Si2p spectrum recorded from the Ag-PDMS film nanoparticles showed a single chemically distinct peak centered at 102.5 eV (FIG. 7B) which is consistent with the reported value in literature. [A. Dane et al., *Journal of Physical Chemistry B* 2006, 110, 1137]. The absence of any shift in Si2p binding energy in Ag-PDMS, as compared to PDMS, indicated there was no strong chemical interaction between the nanoparticles and the polymer matrix.

Figure 8B:
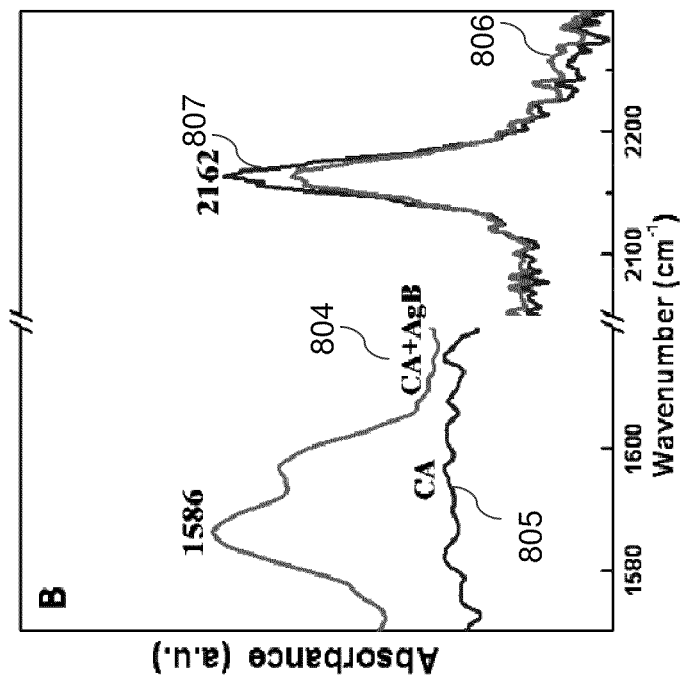
FIG. 8B is the FTIR spectra of (1) the silver benzoate solution with curing agent, and (2) the pure curing agent in the vials of FIG. 8A.
Figure 8A:
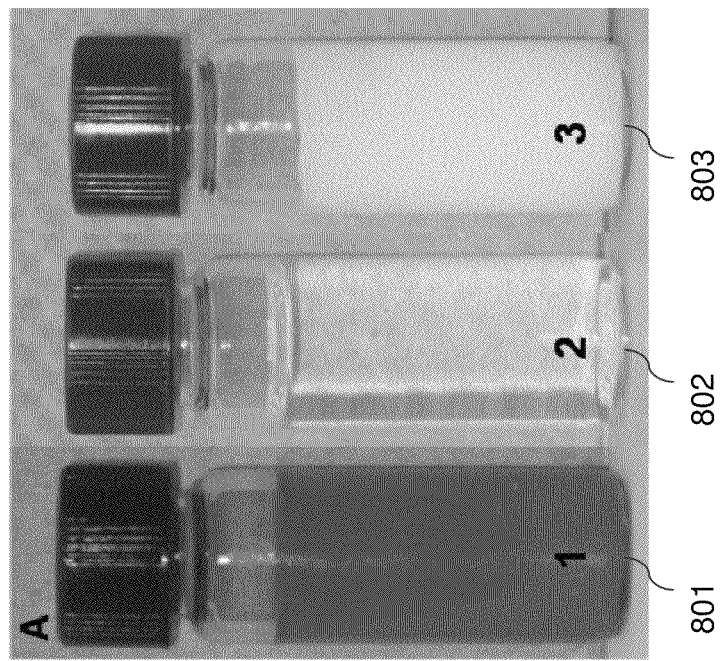
FIG. 8A shows vials containing (1) a silver benzoate solution with curing agent, (2) pure curing agent, and (3) silver benzoate with pure elastomer.

To confirm the mechanism of formation of nanoparticles further, control experiments were performed wherein silver benzoate solution was separately mixed with the pure elastomer and the curing agent. As shown in FIG. 8A, the silver benzoate solution with curing agent (solution 801) turned yellowish-brown while the solution with silver benzoate and pure elastomer (solution 803) showed no color transformation. (The pure curing agent is shown in solution 802). Similarly, gold and platinum salts were also reduced by curing agent but did now show any reduction with pure elastomer. These control experiments revealed that the curing agent was responsible for the reduction of metal salt.

FTIR spectra of pure curing agent (CA, i.e., solution 802) and curing agent after formation of nanoparticles (brown colored, CA+AgB, i.e., solution 801) were compared. As shown in curves 804 and 805 in FIG. 8B (for CA+AgB (solution 801) and CA (solution 802), respectively), the peak at 1586 cm$^{-1}$ is from carboxylic group present in silver benzoate, which is not present in the pure curing agent (solution 802). The absorbance peak at 2162 cm$^{-1}$ in both spectra corresponds to the Si—H stretching vibration. [W. F. Maddams, *Spectroc. Acta Pt. A-Molec. Biomolec. Spectr.* 1994, 50, 1967]. The comparison between spectra—curves 806 and 807 for CA+AgB (solution 801) and CA (solution 802), respectively—indicated that the peak intensity of Si—H group was reduced after formation of silver nanoparticles. This confirmed the Si—H group in the curing agent was taking part in the reaction and was responsible for the reduction of metal ions. The Si—H bonds were oxidized to Si—O—Si bonds and reduced the metal ions to metal as has been observed in the literature. [Zhang].

Synthesis of Gold Nanoparticle-Embedded Polymer Composites

In another embodiment of the present invention, gold nanoparticle-embedded polymer composites were synthesized. The process as described above for synthesizing silver nanoparticle-embedded PDMS was performed with gold chloride being utilized in lieu of the silver benzoate. The gold chloride was dissolved using an appropriate amount of solvent ($10^{-4}$ M chloroauric acid solution in methanol). 4 ml of this solution were added to 8 grams PDMS dissolved in methylene chloride. After mixture with the PDMS and the curing agent, this mixture was casted on glass slides and cured under vacuum at room temperature to yield a gold-nanoparticle-embedded PDMS film.

Figure 9:
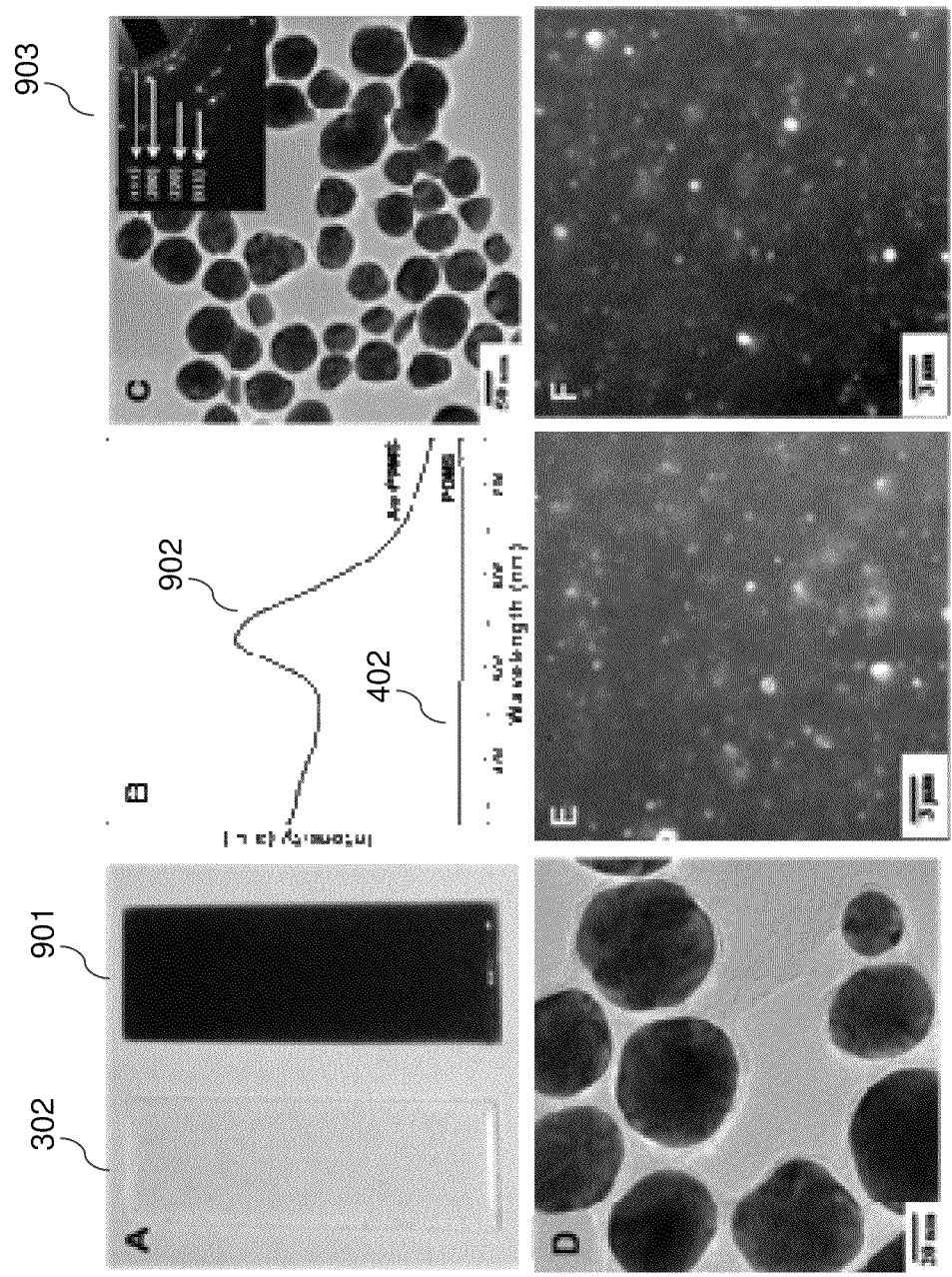
FIG. 9A shows a gold nanoparticle-embedded PDMS film synthesized utilizing an embodiment of the present invention and a pure PDMS film.
FIG. 9B is a UV-Visible spectrum of the gold nanoparticle-embedded PDMS film shown in FIG. 9A.
FIGS. 9C-9D are low and high magnification TEM images of gold nanoparticles extracted from the gold nanoparticle-embedded PDMS film shown in FIG. 9A.
FIGS. 9E-9F are optical images using a high resolution and high contrast condenser (CytoViva) to determine the particle distribution of the gold nanoparticle-embedded PDMS film shown in FIG. 9A.

FIG. 9A is the photograph of pure PDMS film 302 and the gold nanoparticle-embedded PDMS (Au-PDMS) film 901. Au-PDMS film 901 is ruby red, which is a characteristic color of gold nanoparticles. FIG. 9B is the UV-Visible spectra of Au-PDMS film 901 and pure PDMS film 302 (curves 902 and 402, respectively). As noted above, pure PDMS film 302 did not show any absorbance in the visible region. Au-PDMS film 901 had an absorbance centered at approximately 530 nm. This absorbance was due to the surface plasmon excitation of gold nanoparticles [Zhang] and confirmed the nanoparticle formation. FIGS. 9C-9D are low and high magnification TEM images of gold nanoparticles extracted from Au-PDMS film 901, which show that the gold nanoparticles are uniform and discrete. The diffraction pattern (illustrated in inset 903) revealed that they are crystalline in nature. Optical images (FIGS. 9E-9F) were taken at different regions of the film using a high resolution and high contrast condenser (CytoViva) to determine the particle distribution of the nanoparticles in the matrix. FIGS. 9E-9F show that the gold nanoparticles were uniformly distributed over a large area with out any phase separation.

Synthesis of Platinum Nanoparticle-Embedded Polymer Composites

In another embodiment of the present invention, platinum nanoparticle-embedded polymer composites were synthesized. The process as described above for synthesizing silver nanoparticle-embedded PDMS was performed with chloroplatinic acid being utilized in lieu of the silver benzoate. The chloroplatinic acid was dissolved using an appropriate amount of solvent ($2\times10^{-5}$ M chloroplatinic acid solution in methanol). 4 ml of this solution were added to 8 grams PDMS dissolved in methylene chloride. After mixture with the PDMS and the curing agent, this mixture was casted on glass slides and cured under vacuum at room temperature to yield a platinum-nanoparticle-embedded PDMS film.

Figure 10:
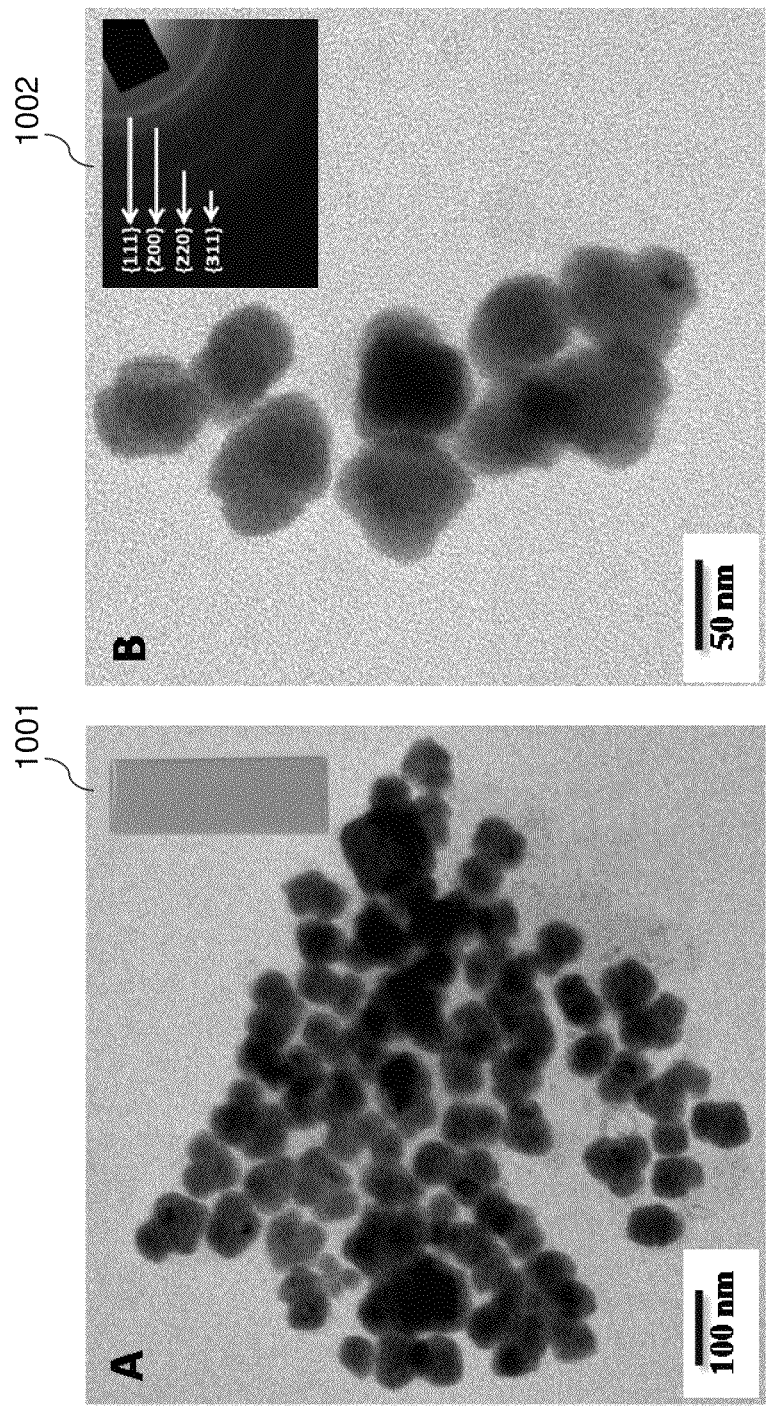
FIGS. 10A-10B show a platinum nanoparticle-embedded PDMS film synthesized utilizing an embodiment of the present invention and further show low and high magnification TEM images of this platinum nanoparticle-embedded PDMS film.

The inset of FIG. 10A is a photograph of platinum nanoparticle-embedded PDMS (Pt-PDMS) film 1001. The PT-PDMS film 1001 is brown, which is a characteristic color of platinum nanoparticles.

FIGS. 10A-10B are low and high magnification TEM images of Pt-PDMS film 1001. The nanoparticles are irregular and polydispersed in nature with an average particle size of 50 nm. The diffraction of platinum nanoparticles (inset 1002 in FIG. 10B) indicated their fcc crystalline nature.

Synthesis of Other Pure Metal/Metal Oxide Nanoparticle-Embedded Composites

In embodiments of the present invention, other metal and metal oxide nanoparticle-embedded polymer composites were synthesized. Other metals (such as palladium, cobalt, and nickel) and metal oxides (such as iron oxide) were synthesized by in-situ thermal decomposition using a process similar to those discussed above for synthesizing silver, gold, and platinum nanoparticle-embedded films.

In embodiments of the present invention, 3 ml of $2\times10^{-2}$ M solution of metal precursor (such as, for example, palladium acetylacetonate, cobalt acetylacetonate, nickel acetylacetonate etc.) in hexane was mixed to 9 gm of PDMS elastomer and 1 gm curing agent. The resultant solution was sonicated to yield a uniform solution and cured at 80° C. After curing, the PDMS matrix was examined and the degree of nanoparticle formation was not present to the same extent as was present during the synthesis of the silver, gold, and platinum nanoparticle-embedded films. Subsequently, the PDMS matrix was further heated for half an hour in argon atmosphere at about 250 C. On heating, the metal precursor present in the PDMS matrix decomposed and formed nanoparticles that were uniformly distributed in the matrix.

Figure 11B:
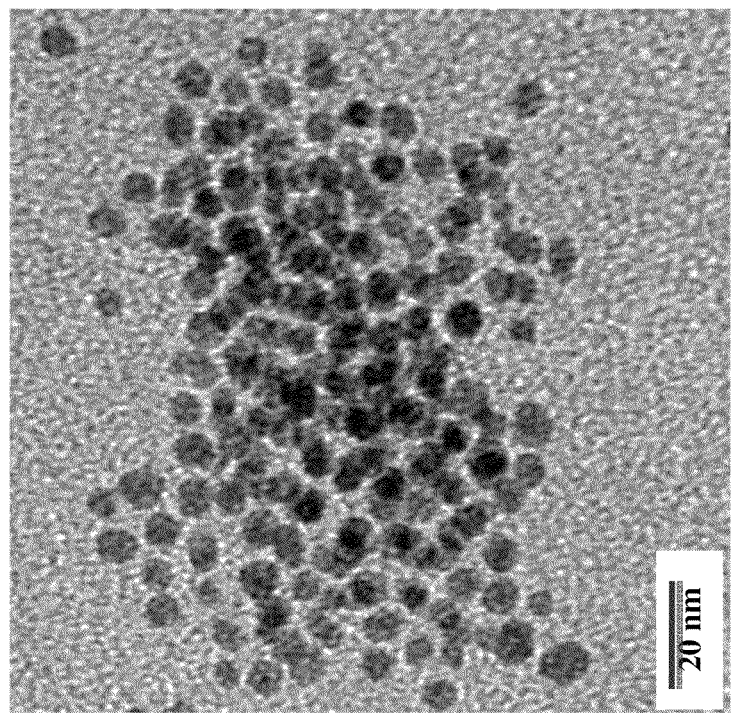
FIG. 11B is a TEM images of palladium nanoparticles extracted from the palladium nanoparticle-embedded PDMS film shown in FIG. 11A.
Figure 11A:
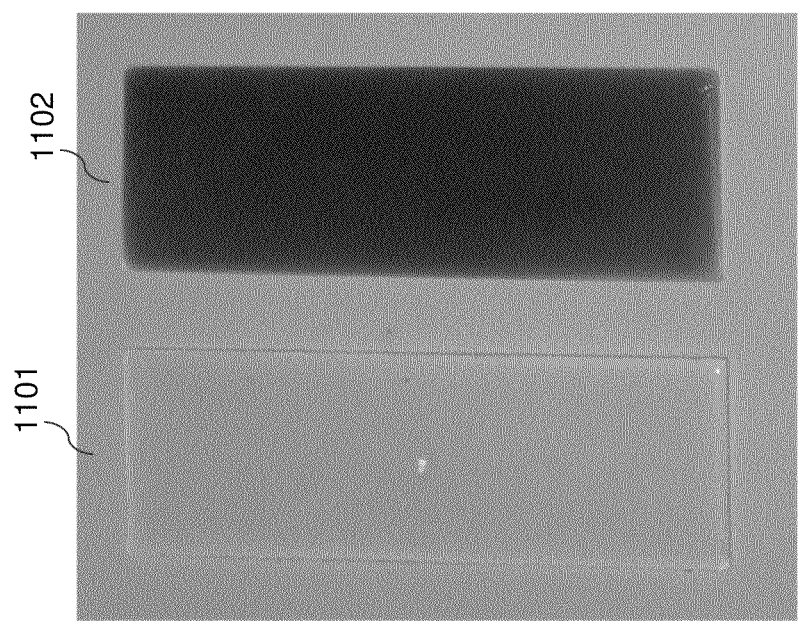
FIG. 11A is a photograph of a palladium nanoparticle-embedded PDMS film synthesized utilizing an embodiment of the present invention.

FIG. 11A is a photograph of a palladium nanoparticle-embedded PDMS (Pd-PDMS) film synthesized as described above. Pd-PDMS film 1101 is the film after curing but before the further heating step. Pd-PDMS film 1102 is the same film after further heating at 250° C., which showed a noticeable change in the color from light yellow to blackish brown. Blackish brown is a characteristic color of palladium nanoparticles. FIG. 11B is a TEM image of palladium nanoparticles extracted from Pd-PDMS film 1102.

Figures 12A, 12B, 12C, 12D:
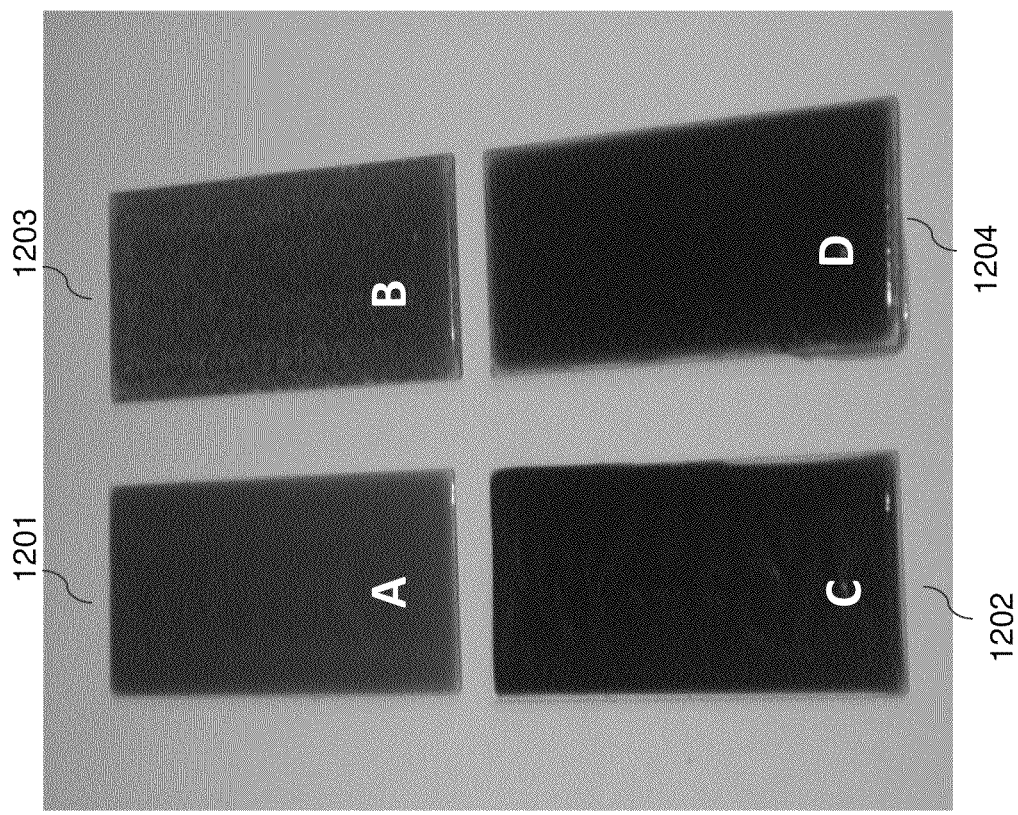
FIGS. 12A and 12C are photographs of an iron oxide nanoparticle-embedded PDMS film synthesized utilizing an embodiment of the present invention.
FIGS. 12B and 12D are photographs of a nickel oxide nanoparticle-embedded PDMS film synthesized utilizing an embodiment of the present invention.

FIGS. 12A and 12C are photographs of an iron oxide nanoparticle-embedded PDMS (iron oxide-PDMS) film synthesized as described above. Iron oxide-PDMS film 1201 in FIG. 12A is the film after curing but before the further heating step. Iron oxide-PDMS film 1202 in FIG. 12C is the same film after further heating at 250° C., which shows a noticeable change in the color from dark orange to blackish brown. Blackish brown is a characteristic color of iron oxide nanoparticles.

FIGS. 12B and 12D are photographs of a nickel oxide nanoparticle-embedded PDMS (Nickel oxide-PDMS) film synthesized as described above. Nickel oxide-PDMS film 1203 in FIG. 12B is the film after curing but before the further heating step. Nickel oxide-PDMS film 1204 in FIG. 12D is the same film after further heating at 250° C., which shows a noticeable change in the color from dark green to blackish brown. Blackish brown is a characteristic color of nickel oxide nanoparticles.

Figure 13B:
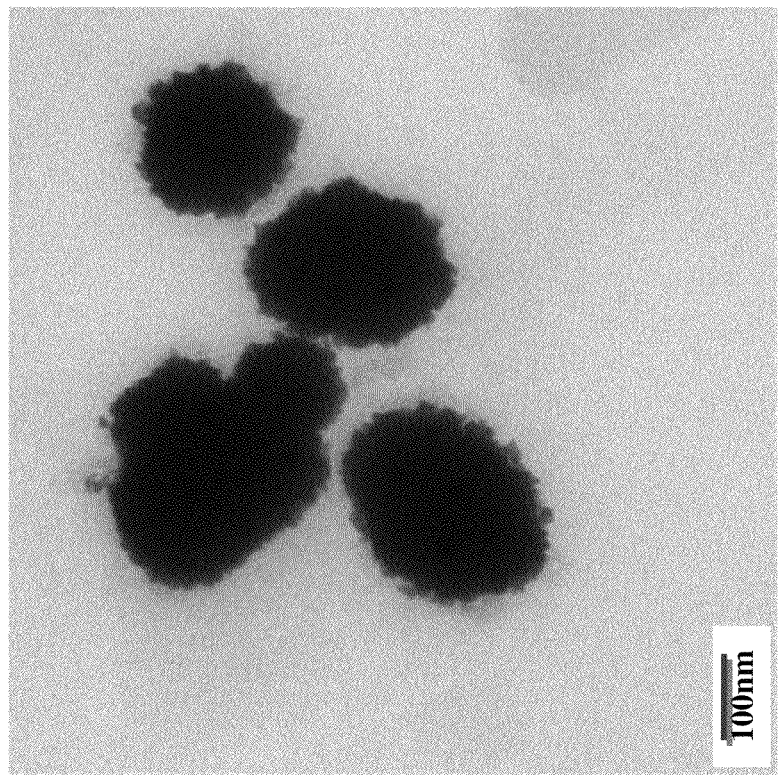
FIGS. 13A-13B are TEM images of iron oxide nanoparticles extracted from the iron oxide nanoparticle-embedded PDMS film shown in FIG. 12C.
Figure 13A:
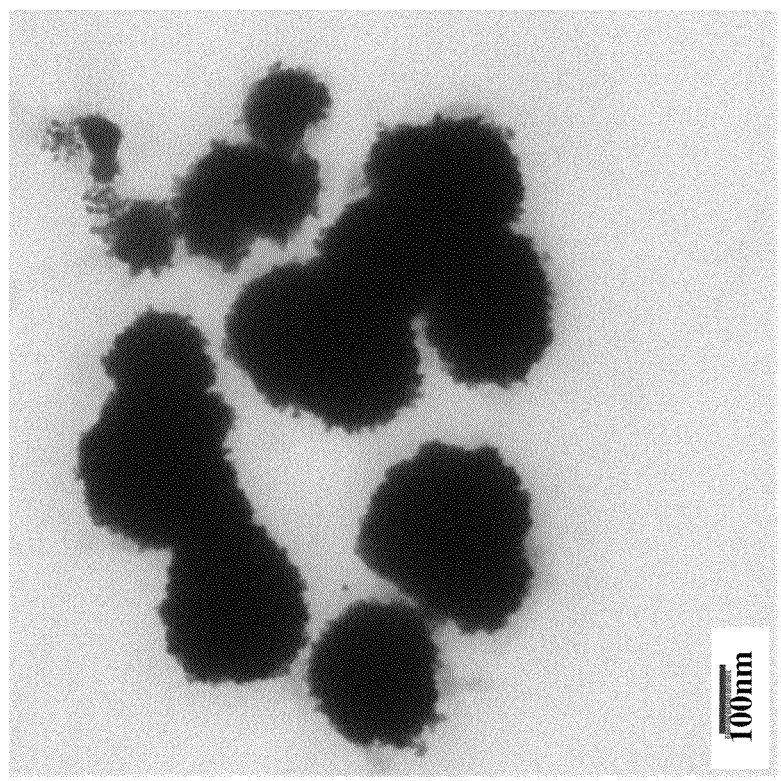

FIGS. 13A-13B are TEM images of iron oxide nanoparticles extracted from iron oxide-PDMS film 1202.

Figure 14B:
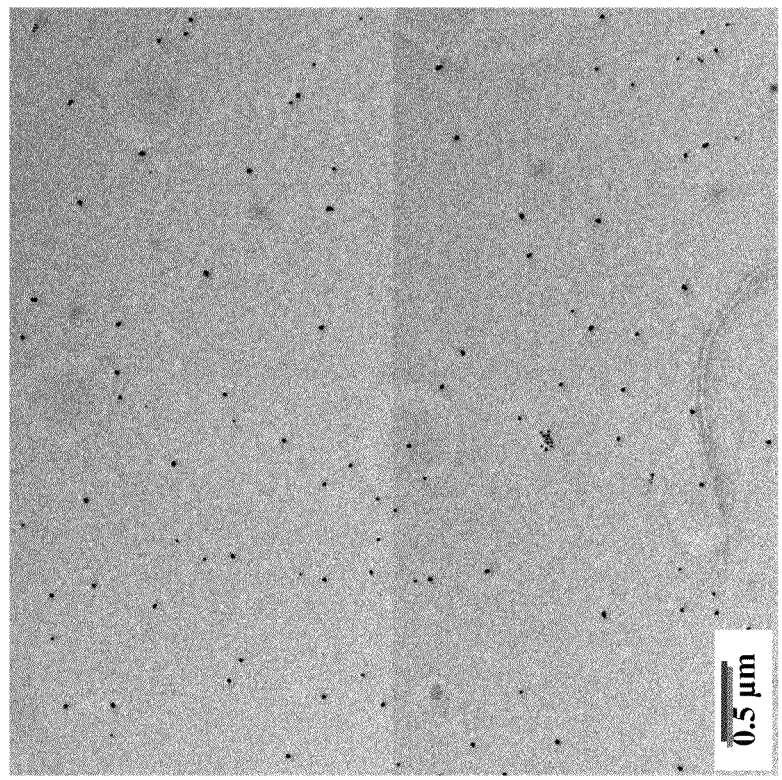
FIGS. 14A-14B are high and low magnification TEM images of nickel oxide particles extracted from the nickel oxide nanoparticle-embedded PDMS film shown in FIG. 12D.
Figure 14A:
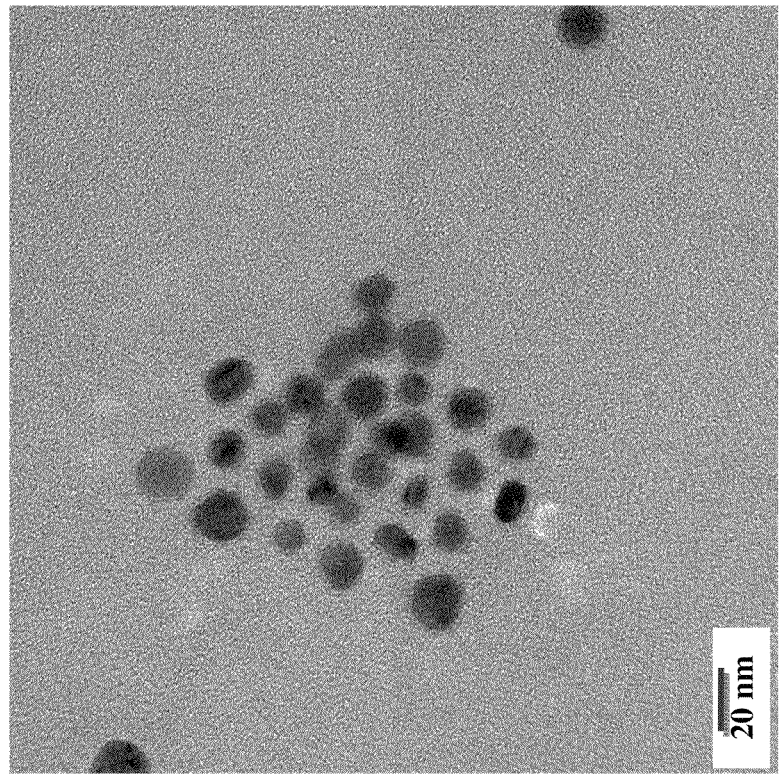

FIGS. 14A-14B are high and low magnification TEM images of nickel oxide nanoparticles extracted from nickel oxide-PDMS 1204.

Synthesis of Metal/Metal Oxide-Alloy Nanoparticle-Embedded Composites

In embodiments of the present invention, metal/metal oxide-alloy nanoparticle-embedded polymer composites were synthesized. Metal alloy nanoparticles (such as PdFe, PdNi, PdCo, PtFe, PtNi, PtCo, NiCo, CuNi, CuNi, CuPd, CuPt, NiFe, FeCo) and metal oxide alloy nanoparticles (such as the oxides thereof) can be (and in some cases were) synthesized by a similar approach as described above for silver, gold, platinum, and other pure metal/metal oxide nanoparticle-embedded films. 1.5 ml of $2\times10^{-2}$ M solution of each metal precursor (e.g., palladium acetylacetonate, cobalt acetylacetonate, nickel acetylacetonate iron carbonyl, nickel carbonyl, and cobalt carbonyl, etc.) soluble in nonpolar solvent (such as hexane) were mixed to 9 gm of PDMS elastomer and 1 gm curing agent. The resultant solution was sonicated to yield a uniform solution and cured at 80° C. After curing, the PDMS matrix was further heated for half an hour in argon atmosphere at 250° C. On heating, the metal salts decomposed and formed alloy nanoparticles that were uniformly distributed in PDMS matrix.

Mechanical Properties

Improved mechanical properties of PDMS were previously achieved by dispersing carbon nanotubes in the polymer. [L. Ci et al., *Nano Letters* 2008, 8, 2762] Ci et al. found that the longitudinal modulus and damping capability of carbon nanotube reinforced PDMS matrices were improved by an order of magnitude over pure PDMS. Other materials such as $CaCO_3$, $SiO_2$ have also been used as fillers in PDMS polymer. [T. Kaully et al., *Polym. Compos.* 2008, 29, 396; R. H. Gee et al., *Polymer* 2004, 45, 3885]. The effect of filler particle size, shape, and distribution, filler properties, filler-filler interactions, and filler-matrix interactions can have a significant role in the mechanical properties of the polymer. [See, e.g., D. Ciprari et al., *Macromolecules* 2006, 39, 6565]. The synthesis of metal/metal oxide nanoparticles embedded in the polymer film of the present invention likewise affected the mechanical properties of the polymer film.

Figure 15A:
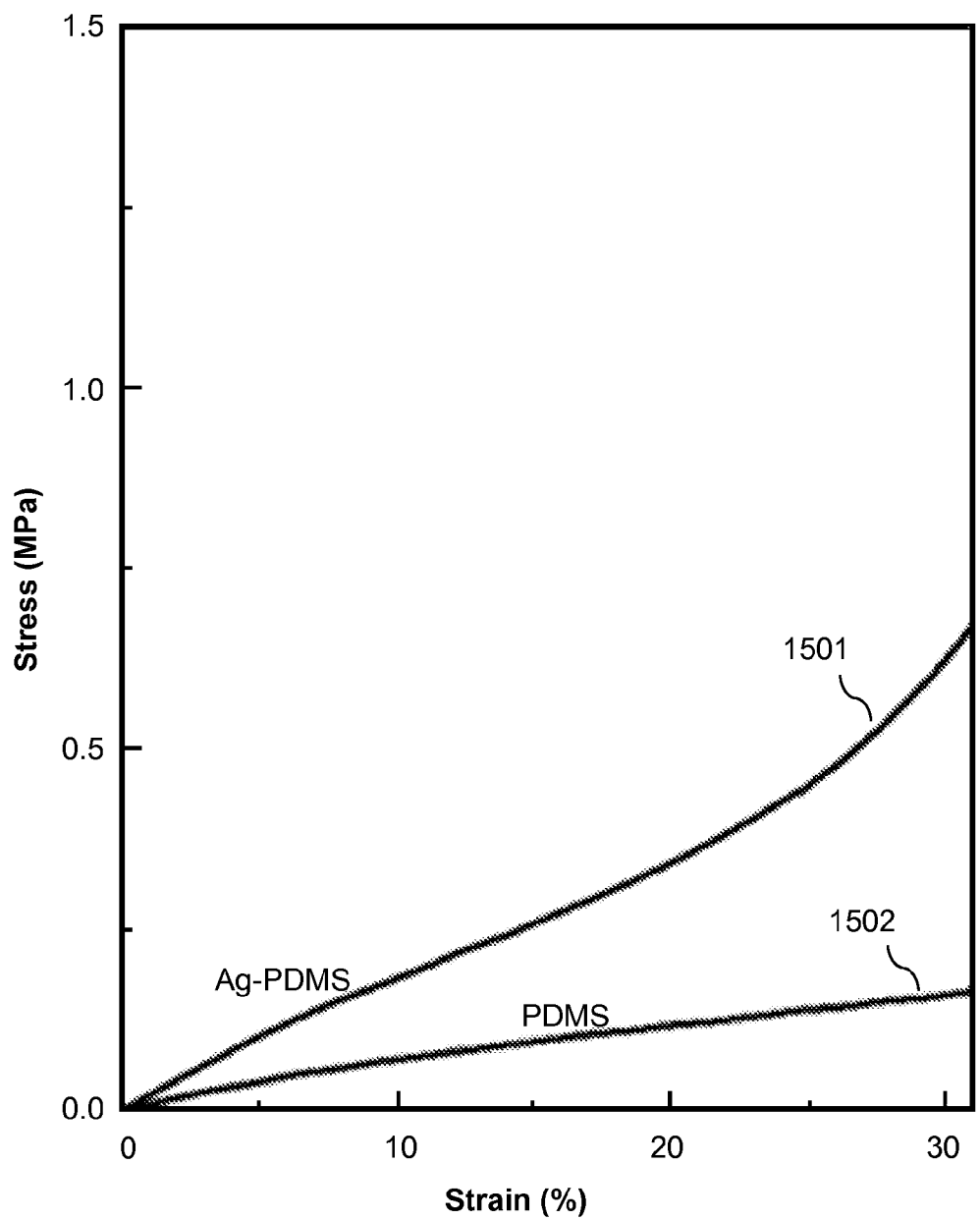
FIG. 15A illustrates stress-strain curves for the silver nanoparticle-embedded PDMS film shown in FIG. 3 and a pure PDMS film.

PDMS is a viscoelastic material. Dynamic mechanical testing was utilized to separately examine elastic and viscous components of Ag-PDMS films synthesized utilizing the process described herein (which films contained about 0.1 weight % silver). As illustrated in FIG. 15A, stress-strain curves 1501 and 1502 was recorded for these films and for pure PDMS films, respectively. Dynamic mechanical analyzer was used in the tension mode at 1 Hz frequency and 0.01 N preload. The quasi-static Young's modulus was calculated using the slope of the best-fit line to the linear part of the curve extending until 20% strain. Overlay of the stress-strain curves showed that the Young's modulus for the Ag-PDMS films was 1.64 MPa, which was approximately 3 times higher than 0.56 MPa for the pure PDMS films. The average modulus was found to be 1.7±0.2 MPa for Ag-PDMS films and 0.5±0.1 MPa for pure PDMS films. The values for PDMS were comparable to those reported earlier. [N. Stafie et al., *Separation and Purification Technology* 2005, 45, 220]. The increase in modulus for Ag-PDMS films indicated the silver nanoparticles formed a good interface with the polymer. This served to improve load transfer within the nanocomposite network, resulting in a higher Young's modulus (approximately three times higher or more).

Figure 15B:
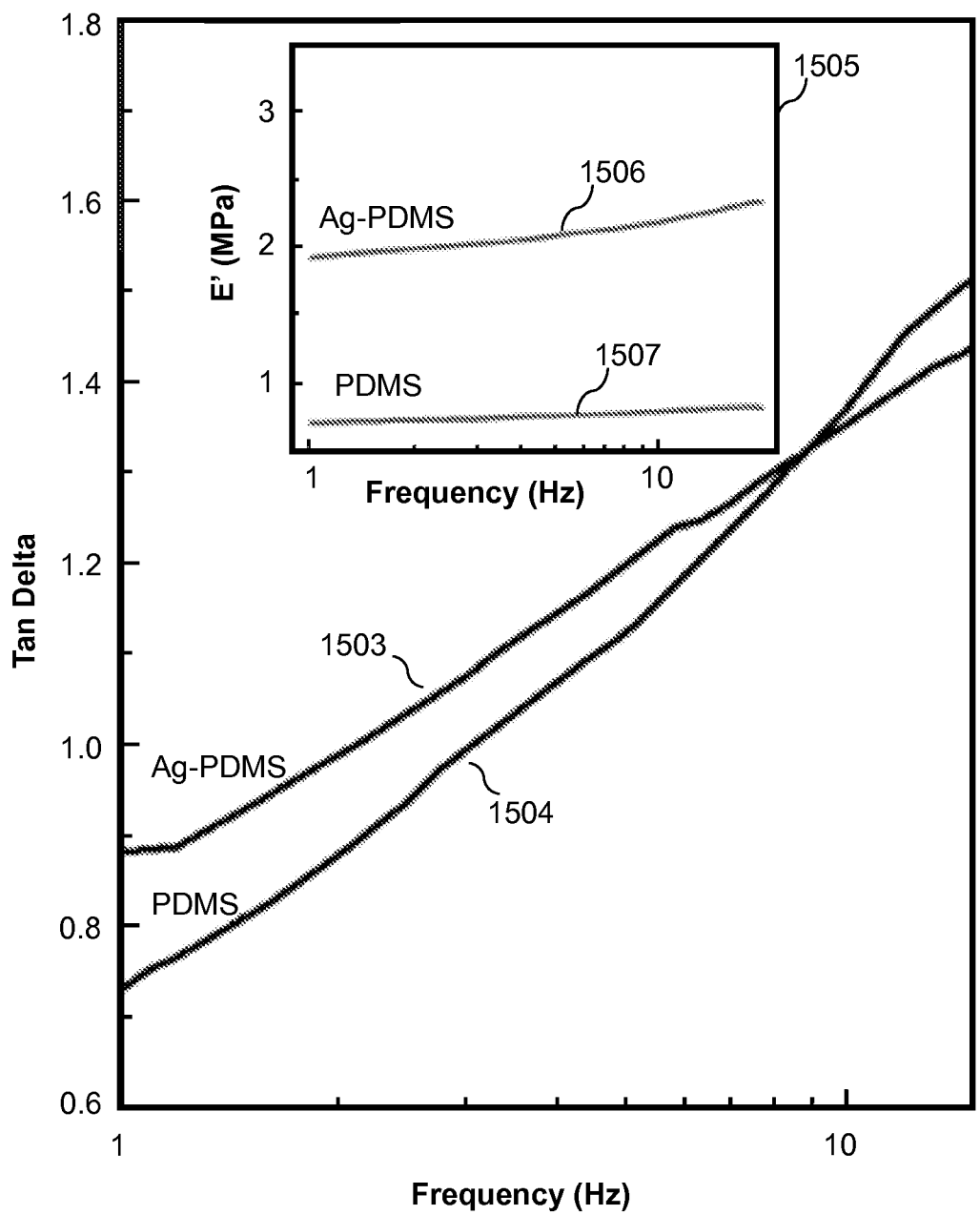
FIG. 15B illustrates dynamic frequency sweep plot curves for the silver nanoparticle-embedded PDMS film shown in FIG. 3 and a pure PDMS film.

Differences in the energy dampening properties were also evaluated by measuring storage and loss moduli at room temperature as a function of frequency (1-15 Hz) under an oscillatory load. The phase shift, tan delta indicated the damping effectiveness of a material. The dynamic frequency sweep plot (FIG. 15B) for the tangent delta values demonstrated that there was no significant difference between the damping capabilities of Ag-PDMS films and pure PDMS films), as shown in curves 1503 and 1504, respectively. Like any characteristic viscoelastic material, the storage modulus increased with frequency, as shown in inset 1505 of FIG. 15B (showing the curves 1506 and 1507 for Ag-PDMS films and pure PDMS films, respectively). The restraining effect of the inorganic component, such as silver, on the chain mobility of the PDMS depended on the extent of chain confinement caused by silver nanoparticles at the interface. Owing to very high specific surface area of extremely small silver particles, a good interface was formed between the particles and PDMS that increased the storage modulus reasonably. The friction between relatively less mobile PDMS chains at the interface also increased leading to an increase in the loss modulus also. However, the ratio of the two moduli did not change significantly, thereby keeping tan delta same.

Swelling

Poor chemical compatibility of PDMS (as well as other polymers) with organic solvents poses a major restriction on its application including PDMS-fabricated microfluidic channel when the studies are restricted to the use of non-wetting polar liquids. It was found that the behavior of the metal/metal oxide synthesized nanoparticle-embedded films changed the behavior of these films in a range of organic solvents.

Pre-weighed films ($W_i$) were immersed in different solvents at room temperature to quantify the organic solvent tolerance of Ag-PDMS films synthesized as described herein. The films were weighed at different time intervals ($W_o$) until no change in weight was seen. This allowed the films to reach equilibrium swelling. The degree of swelling (SD) was calculated based on the difference between the two readings:

$$SD(\%) = \left(\frac{w_o - w_i}{w_i}\right) \times 100$$

Comparison of the degree of swelling for Ag-PDMS and pure PDMS films is shown in the following table (TABLE 1).

TABLE 1

| Solvent | Ag-PDMS Film | Pure PDMS Film |
|---|---|---|
| (Percentage degree of swelling) | | |
| THF | 218 | 175 |
| Toluene | 195 | 132 |
| Methylene Chloride | 225 | 152 |
| Acetone | 16 | 17 |
| Water | 0 | 0 |

Table 1 reveals that in organic medium, the Ag-PDMS film swelled more as compared to the pure PDMS film. However, there was no significant difference in the swelling for polar solvents. It is believed that the lesser resistance of Ag-PDMS to organic solvents may be due to a lower degree of cross-linking. [See N. Stafie et al., *Separation and Purification Technology* 2005, 45, 220]. Some of the curing agent was consumed in the reduction of the silver salt and hence the available curing agent for cross-linking in Ag-PDMS was less than in pure PDMS, which may result in the greater swelling.

Uses and Applications

Utilities of the metal/metal oxide nanoparticle-embedded polymer composites of the present invention include, but are not limited to the following:

Enhanced mechanical properties of PDMS render the composites of the present invention useful for applications in pneumatic actuators and microfluidic channels.

The combination of improved mechanical and antibacterial properties make the Ag-PDMS composites (and other Ag-polymer composites) of the present invention suitable for biomedical devices and applications, particularly implantation materials, contact lenses, and cosmetics.

Metal/metal oxide nanoparticle-embedded polymer composites membranes can be used for gas and vapor phase separation.

Metal/metal oxide nanoparticle-embedded polymer composites membranes can be used as a catalyst. For example, it can be used as a membrane reactor.

The metal/metal oxide nanoparticle-embedded polymer composites can be also be used as: a membrane for separation of organics from water; a micro-fluidic based reactor; a damping material; an antibacterial glue or lubricant; an antibacterial coating agent; hydrogen storage materials; an other lubricant, a conditioner, a gloss enhancer, a sealing agent, and an antifoaming agent.

By way of example, the presence of silver nanoparticles makes the Ag-PDMS composites (and other Ag-nanoparticle-embedded polymer composites) attractive for biomedical applications [R. M. Slawson et al., *Plasmid* 1992, 27, 72] and antibacterial coatings [A. Kumar et al., *Nature Materials* 2008, 7, 236] due to its inherent antimicrobial properties. The antibacterial activity of the Ag-PDMS films was evaluated by incubating *Bacillus subtilis* and *Escherichia coli* bacterial strains with the films.

The Ag-PDMS films were carefully sterilized by autoclaving at 121° C. for 30 minutes and then incubated overnight (16-18 hours) with microorganisms. Cultures exposed to pure PDMS films (i.e., without embedded Ag nanoparticles) were used as controls. Antimicrobial activity was tested on *Bacillus subtilis* 168 (ATCC 31578; Gram positive) and *Escherichia coli* K12 (ATCC 25404; Gram negative) to evaluate antibacterial efficacy for different bacterial cell wall morphological properties. The strains were grown on Luria-Bertani broth at 37° C. while shaking at 150 rpm, harvested during exponential growth, and re-suspended in minimal Davis media for the experiments. [S. Mahendra et al., *Environmental Science and Technology* 2008, 42, 9424]. Bacterial growth was monitored in the presence of the films. Growth of cells in suspensions was measured in terms of absorbance at 600 nm, and converted to colony forming units (CFU/mL) using strain specific standard curves. Bacterial mortality was also determined by viable plate counts after 24 hours growth.

Both (Gram-positive) *B. subtilis* and (Gram-negative) *E. coli* bacteria experienced decreased growth in the presence of the Ag-PDMS film membranes. Viable plate counts were carried out to distinguish bactericidal from bacteriostatic effects.

It was discovered that 80% *E. coli* and 52% *B. subtilis* were inactivated upon 24 hours exposure to Ag-PDMS, as shown in the following table (TABLE 2).

TABLE 2

| (Antibacterial activity of AG-PDMS films toward *E. coli* and *B. subtilis*) | | |
|---|---|---|
| | *E. coli* ($10^4$ CFU/mL) | *E. coli* ($10^4$ CFU/mL) |
| Control Culture | 3.1 ± 0.3 | 2.0 ± 0.13 |
| Pure PDMS film | 3.0 ± 0.3 | 2.0 ± 0.44 |
| Ag-PDMS film | 0.66 ± 0.1 | 0.96 ± 0.12 |

It is believed that the bacterial growth inhibition and inactivation may be attributed to very low concentrations of silver ions (9 ppb) released from the Ag-PDMS films as measured by ICP. The exposure to silver ions caused several orders of magnitude reduction in bacterial populations. The amounts of inhibition and inactivation obtained in this study are comparable to those previously reported for products containing silver nanoparticles. [O. Choi et al., *Water Res.* 2008, 42, 3066; S. K. Gogoi et al., *Langmuir* 2006, 22, 9322]. The incorporation of silver nanoparticles confers antibacterial properties to PDMS and extends the use of PDMS in biomedical applications.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. A method of synthesizing a nanoparticle-embedded polymer composite, the method comprising:
   (a) mixing a metal precursor and a solvent to form a metal salt,
       wherein the molar concentration of the metal precursor in the solvent is in the range between $1 \times 10^{-5}$ and about $5 \times 10^{-2}$,
       wherein the metal precursor is selected from the group consisting of silver benzoate, chloroauric acid, palladium acetylacetonate, cobalt acetylacetonate, nickel acetylacetonate, iron carbonyl, nickel carbonyl, and cobalt carbonyl, and
       wherein the formed metal salt comprises a metal selected from the group consisting of silver, gold, palladium, platinum, copper, cobalt, nickel, iron, and combinations thereof;
   (b) combining a polymerizable material, a polymerizing agent, and the metal salt to form a mixture,
       wherein the polymerizable material is selected from the group consisting of (i) polydimethylsiloxane, (ii) polystyrene, (iii) poly(methyl methacrylate), (iv) polyvinyl acetate, (v) polyethylene, (vi) monomers and oligomers that polymerize to form the polymers of (i)-(v), and combinations thereof, and wherein the polymerizable material and the polymerizing agent are combined in a weight ratio in the range between about 2:1 and about 10:1; and (c) forming the nanoparticle-embedded polymer composite by (i) polymerizing the polymerizable material to form a polymer, wherein the polymerizing occurs at a temperature in the range between about room temperature and about 100° C., (ii) reducing the metal salt to form nanoparticles embedded within the polymer, wherein the polymerizing agent polymerizes the polymerizable material to form the polymer and reduces the metal salt to form the nanoparticles, and (iii) heating the polymer after the polymerization step, wherein the heating is performed at a temperature in the range between about 150° C. and about 300° C., and wherein the heating decomposes the metal salt to form nanoparticles.

2. The method of claim 1, further comprising agitating the mixture such that there is a bulk dispersion of nanoparticles in the nanoparticle-embedded polymer composite.

3. The method of claim 2, wherein said step of agitation uniformly distributes the polymerizable material, the polymerizing agent, and the metal salt in the mixture.

4. The method of claim 1, wherein the polymerizable material is a siloxane.

5. The method of claim 4, wherein the siloxane is polydimethyl siloxane.

6. The method of claim 1, wherein the step of polymerizing the polymerizable material to form a polymer is selected from the group consisting of peroxide-initiated polymerization, platinum-catalyzed addition polymerization, and tin-catalyzed condensation polymerization.

7. The method of claim 1, wherein the polymerizing agent is capable of initiating a polymerization selected from the group consisting of peroxide-initiated polymerization, platinum-catalyzed addition polymerization, and tin-catalyzed condensation polymerization.

8. The method of claim 1, wherein the metal salt comprises silver.

9. The method of claim 1, wherein the metal precursor comprises silver benzoate.

10. The method of claim 1, wherein the metal precursor comprises a transition metal.

11. The method of claim 1, wherein the metal precursor comprises at least two transition metals.

12. The method of claim 1, wherein the metal salt is further prepared by mixing a second metal precursor with the metal precursor and the solvent.

13. The method of claim 1, wherein the solvent is a non-polar solvent.

14. The method of claim 1, wherein the ratio of (A) the polymerizable material and the polymerizing agent and (B) the metal precursor and solvent is in the range between about 2 grams/ml and about 4 grams/ml.

15. The method of claim 1, wherein the weight ratio of the polymerizable material and the polymerizing agent is about 10:1.

16. The method of claim 1, further comprising degassing the mixture.

17. The method of claim 1, further performing the polymerization step at about room temperature.

18. The method of claim 1, wherein said heating step is performed at a temperature in the range between about 200° C. and about 250° C.

19. The method of claim 1, wherein the nanoparticles comprise pure metal nanoparticles.

20. The method of claim 1, wherein the nanoparticles comprise metal alloy nanoparticles.

21. The method of claim 1, wherein the nanoparticles comprise pure metal oxide nanoparticles.

22. The method of claim 1, wherein the nanoparticles comprise metal oxide alloy nanoparticles.

23. The method of claim 1, wherein
(i) the polymerizable material comprises polydimethylsiloxane;
(ii) the metal salt comprises a metal selected from the group consisting of silver, gold, and palladium;
(iii) the polymerizing agent polymerizes the polymerizable material to form the polymer at about room temperature; and
(iv) the polymerizable agent reduces the metal to form bare, noble metal nanoparticles embedded within the polymer.

24. The method of claim 23, wherein the metal salt comprises silver.

25. The method of claim 1, wherein a majority of the nanoparticles range in size between about 5 nm and about 20 nm.

* * * * *